(12) United States Patent
Elshafie et al.

(10) Patent No.: US 11,792,793 B2
(45) Date of Patent: Oct. 17, 2023

(54) REDUCED DOWNLINK CONTROL INFORMATION (DCI) FEEDBACK FOR SEMI-PERSISTENT SCHEDULING (SPS)

(71) Applicant: QUALCOMM INCORPORATED, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/452,057

(22) Filed: Oct. 22, 2021

(65) Prior Publication Data

US 2022/0132544 A1    Apr. 28, 2022

Related U.S. Application Data

(60) Provisional application No. 63/106,039, filed on Oct. 27, 2020.

(51) Int. Cl.
| | |
|---|---|
| *H04W 72/12* | (2023.01) |
| *H04L 1/00* | (2006.01) |
| *H04L 1/16* | (2023.01) |
| *H04W 72/1273* | (2023.01) |
| *H04L 1/1607* | (2023.01) |
| *H04W 72/23* | (2023.01) |
| *H04W 72/50* | (2023.01) |

(52) U.S. Cl.
CPC ....... *H04W 72/1273* (2013.01); *H04L 1/0025* (2013.01); *H04L 1/1614* (2013.01); *H04W 72/23* (2023.01); *H04W 72/535* (2023.01)

(58) Field of Classification Search
CPC ............ H04W 72/1273; H04W 72/23; H04W 72/535; H04L 1/0025; H04L 1/1614; H04L 1/1819; H04L 1/1887; H04L 1/1896
See application file for complete search history.

(56) References Cited

U.S. PATENT DOCUMENTS

| | | | | |
|---|---|---|---|---|
| 2017/0171817 A1* | 6/2017 | Zhao | ...................... | H04W 72/21 |
| 2019/0082456 A1* | 3/2019 | Kim | .................... | H04L 27/2602 |
| 2021/0084677 A1* | 3/2021 | Wänstedt | ................ | H04W 4/06 |
| 2022/0312459 A1* | 9/2022 | Yang | ..................... | H04L 1/0075 |
| 2022/0386243 A1* | 12/2022 | Liang | .................... | H04W 52/58 |

* cited by examiner

*Primary Examiner* — Hoang-Chuong Q Vu
(74) *Attorney, Agent, or Firm* — Haynes and Boone, LLP /Qualcomm

(57) ABSTRACT

Wireless communications systems and methods related to semi-persistent scheduling (SPS) occasion cancellation or validation are provided. A base station (BS) transmits an SPS configuration to a UE indicating a plurality of SPS occasions. The BS further transmits to the UE a mode indication indicating an occasion-identification mode, the occasion-identification mode indicating whether one or more occasion-identification parameters identify one or more SPS occasions of the plurality of SPS occasions to be cancelled or to be used for transmission. The BS further transmits to the UE the one or more occasion-identification parameters. The BS performs SPS transmission based on the mode indication and the one or more occasion-identification parameters.

30 Claims, 11 Drawing Sheets

REDUCED DOWNLINK CONTROL INFORMATION (DCI) FEEDBACK FOR SEMI-PERSISTENT SCHEDULING (SPS)

CROSS-REFERENCE TO RELATED APPLICATIONS

The present application claims the benefit of U.S. Provisional Application No. 63/106,039, filed Oct. 27, 2020, titled "REDUCED DOWNLINK CONTROL INFORMATION (DCI) FEEDBACK FOR SEMI-PERSISTENT SCHEDULING (SPS)," which is hereby incorporated by reference in its entirety as if fully set forth below and for all applicable purposes.

TECHNICAL FIELD

This application relates to wireless communication systems, and more particularly to semi-persistent scheduling (SPS) transmission-specific cancellation or validation.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may schedule a UE for UL and/or DL communications via dynamic scheduling or semi-persistent scheduling (SPS). For dynamic scheduling, the BS may transmit a scheduling assignment or grant to schedule the UE for each and every UL transmission and/or each and every DL transmission. For SPS, the BS may preconfigure the UE with an SPS configuration indicating a periodicity. The UE may not utilize the SPS-based schedule until the BS activates the SPS configuration. The BS may activate the SPS configuration by indicating a resource allocation for the SPS-based schedule. Once activated, the resource allocation may repeat according to the preconfigured periodicity. As use cases and diverse deployment scenarios continue to expand in wireless communication, SPS-based transmission technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a base station (BS) includes transmitting, to a user equipment (UE), a semi-persistent scheduling (SPS) configuration indicating a plurality of SPS occasions. The method further includes transmitting, to the UE, a mode indication indicating an occasion-identification mode, the occasion-identification mode indicating whether one or more occasion-identification parameters identify one or more SPS occasions of the plurality of SPS occasions to be cancelled or to be used for transmission. The method further includes transmitting, to the UE, the one or more occasion-identification parameters. The method further includes performing SPS transmission based on the mode indication and the one or more occasion-identification parameter.

In an additional aspect of the disclosure, a method of wireless communication performed by a UE includes receiving, from a BS, an SPS configuration indicating a plurality of SPS occasions. The method further includes receiving, from the BS, a mode indication indicating an occasion-identification mode, the occasion-identification mode indicating whether one or more occasion-identification parameters identify SPS occasions to be cancelled or SPS occasions to be used for reception of the plurality of SPS occasions. The method further includes receiving, from the BS, the one or more occasion-identification parameters. The method further includes performing SPS reception based on the mode indication and the one or more occasion-identification parameter.

In an additional aspect of the disclosure, a base station includes a processor and a transceiver. The transceiver is configured to transmit, to UE, an SPS configuration indicating a plurality of SPS occasions. The transceiver is further configured to transmit, to the UE, a mode indication indicating an occasion-identification mode, the occasion-identification mode indicating whether one or more occasion-identification parameters identify one or more SPS occasions of the plurality of SPS occasions to be cancelled or to be used for transmission. The transceiver is further configured to transmit, to the UE, the one or more occasion-identification parameters. The transceiver is further configured to perform SPS transmission based on the mode indication and the one or more occasion-identification parameter.

In an additional aspect of the disclosure, a UE includes a processor and a transceiver. The transceiver is configured to receive, from a BS, an SPS configuration indicating a plurality of SPS occasions. The transceiver is further configured to receive, from the BS, a mode indication indicating an occasion-identification mode, the occasion-identification mode indicating whether one or more occasion-identification parameters identify SPS occasions to be cancelled or SPS occasions to be used for reception of the plurality of SPS occasions. The transceiver is further configured to receive, from the BS, the one or more occasion-identification parameters. The transceiver is further configured to perform SPS reception based on the mode indication and the one or more occasion-identification parameters.

In an additional aspect of the disclosure, a non-transitory computer-readable medium has program code recorded thereon. The program code includes code for causing a BS to transmit, to a UE, an SPS configuration indicating a plurality of SPS occasions. The program code further includes code for causing the BS to transmit, to the UE, a mode indication indicating an occasion-identification mode, the occasion-identification mode indicating whether one or more occasion-identification parameters identify one or more SPS occasions of the plurality of SPS occasions to be cancelled or to be used for transmission. The program code further includes code for causing the BS to transmit, to the UE, the one or more occasion-identification parameters. The program code further includes code for causing the BS to perform SPS transmission based on the mode indication and the one or more occasion-identification parameters.

In an additional aspect of the disclosure non-transitory computer-readable medium has program code recorded thereon. The program code includes code for causing a UE to receive, from a BS, an SPS configuration indicating a plurality of SPS occasions. The program code further includes code for causing the UE to receive, from the BS, a mode indication indicating an occasion-identification mode, the occasion-identification mode indicating whether one or more occasion-identification parameters identify SPS occasions to be cancelled or SPS occasions to be used for reception of the plurality of SPS occasions. The program code further includes code for causing the UE to receive, from the BS, the one or more occasion-identification parameters. The program code further includes code for causing the UE to perform SPS reception based on the mode indication and the one or more occasion-identification parameters.

In an additional aspect of the disclosure, a BS includes means for transmitting, to a UE, an SPS configuration indicating a plurality of SPS occasions. The BS further includes means for transmitting, to the UE, a mode indication indicating an occasion-identification mode, the occasion-identification mode indicating whether one or more occasion-identification parameters identify one or more SPS occasions of the plurality of SPS occasions to be cancelled or to be used for transmission. The BS further includes means for transmitting, to the UE, the one or more occasion-identification parameters. The BS further includes means for performing SPS transmission based on the mode indication and the one or more occasion-identification parameters.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
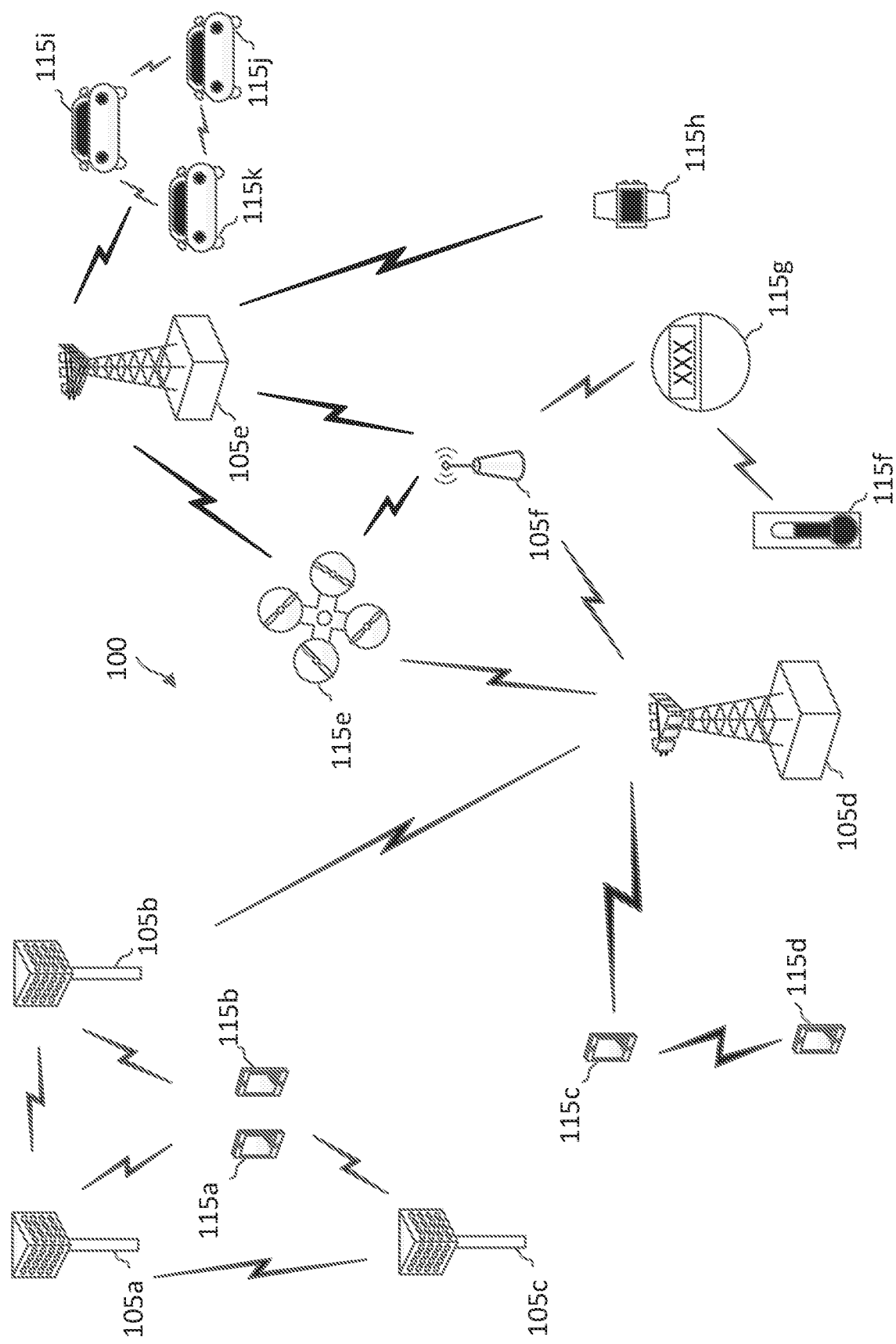
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Semi-persistent scheduling (SPS) is available for downlink (DL)/uplink (UL) communications, primarily to support traffic, such as voice applications, with a periodic pattern. For instance, a base station (BS) may preconfigure a user equipment (UE) with a configured schedule radio network temporary identifier (CS-RNTI) and a periodicity for an SPS-based schedule (e.g., an SPS configuration). Once pre-configured, the UE may monitor for an UL or DL allocation using the CS-RNTI. The BS may activate the SPS configuration by transmitting a physical downlink control channel (PDCCH) downlink control information (DCI) message with a cyclic redundancy check (CRC) scrambled with the CS-RNTI. The PDCCH DCI message may indicate a resource allocation (e.g., time-frequency resource) and transmission parameters (e.g., modulation coding scheme (MCS)). Once activated, the resource allocation is repeated according to the preconfigured periodicity. Accordingly, the UE may receive the activation including the resource allocation and transmission parameters based on the CS-RNTI. The UE may continue to utilize the resource allocation according to the periodicity. For instance, if the SPS configuration is for UL communications, the UE may transmit UL data packet in any of the SPS resources. Alternatively, if the SPS configuration is of DL communications, the UE may monitor for a DL packet in each of the SPS resources.

In some applications, such as Internet of Things (IoT) applications or industrial Internet of Things (IIoT) applications, a network may control a large number of devices (e.g., smart meters, smart sensors, machines, motors, etc.). In some scenarios, the network may control the operations of the devices and may frequently transmit control commands to the devices. In such scenarios, the DL traffic (e.g., physical downlink shared channel (PDSCH) transmissions) may be frequent, but the packet size may be relatively small (e.g., a few bytes to tens of bytes per packet). As such, dynamic scheduling that utilizes PDCCH DCI signaling for each and every transmission can cause a large control channel (PDCCH) overhead. Thus, dynamic scheduling may not be suitable for these applications, and SPS may be more suitable. However, not every SPS occasion being monitored by a UE may actually be used. The UE may be configured to monitor a number of SPS occasions (e.g., PDSCH occasions), but the BS may refrain from transmitting DL data during some of the SPS occasions, for example, based on a traffic pattern and/or the volume of data to be transmitted. The UE may not always be aware of whether a specific SPS occasion was intended to contain DL data. For example, a BS may transmit DL data to be received by the UE during an SPS occasion, but due to obstructions blocking the beam used to transmit the DL data, the UE may not receive the transmission and incorrectly interpret the non-reception of the DL data as an empty SPS occasion.

Additionally, hybrid automatic repeat request (HARQ) may be applied to the PDSCH transmissions, for example, to improve reliability. When HARQ is applied to an SPS PDSCH transmission, the UE may provide HARQ acknowledgement/negative-acknowledgement (ACK/NACK) feedback for each SPS resource. For instance, the UE may perform decoding in each SPS resource and transmit HARQ ACK/NACK feedback for each SPS resource. Since the UE may not be aware when the BS may skip or cancel a transmission in an SPS resource, the UE may unnecessarily perform packet decoding and transmit HARQ NACKs for SPS resources where no SPS transmission is performed by the BS (e.g., the UE may interpret an intentionally empty SPS occasion as a non-empty occasion and assume the presence of an error). The unnecessary packet decoding can impact power and resource utilization at the UE, and the redundant HARQ feedback transmissions can impact radio resource or bandwidth utilization.

To mitigate the problems associated with a UE being unaware of whether an SPS occasion was cancelled, a BS may indicate to a UE which SPS occasions are to be used for transmission (also referred to as non-empty occasions) and which are to be cancelled (also referred to as non-empty occasions). The BS may transmit (e.g., in a DCI message) a bitmap indicating which upcoming SPS occasions are to be used for transmission and which are to be cancelled. A bitmap of length N may correspond to N upcoming SPS occasions, with each bit of the bitmap corresponding to a single SPS occasion. A bit set to 1 may indicate an empty SPS occasion and a bit set to 0 may indicate a non-empty SPS occasion, or vice-versa based on an agreed-upon configuration. For example, the BS may transmit the bitmap 0011 to indicate that of the four upcoming SPS occasions, the third and fourth occasions are cancelled. While this technique may effectively communicate the status of upcoming SPS occasions, it may be difficult to scale when indicating the status of a larger number of SPS occasions, particularly given the size constraints on DCI messages. Accordingly, the present application describes mechanisms enabling a BS to signal to a UE the status (empty or non-empty) of a greater number of SPS occasions that what existing techniques allow.

For instance, after transmitting an SPS configuration (e.g., via RRC) indicating a plurality of SPS occasions for PDSCH transmissions to the UE (for example, by indicating a periodicity), the BS may also transmit a mode indication (e.g., via DCI, RRC, or MAC-CE) indicating an occasion-identification mode. The occasion-identification mode indicates whether occasion-identification parameters transmitted by the BS identify SPS occasions as being cancelled (or empty), or as being used for transmission (or non-empty). The mode may be based on an expected traffic pattern or traffic type. For example, if the BS expects more empty than non-empty occasions over a period of time, the mode may be set to identify non-empty occasions, and vice versa. In other words, the BS may identify the less frequently occurring type of occasions, empty or non-empty. By setting the occasion-identification mode to identify the less-frequently occurring type of occasion, the BS may use fewer resources when indicating to the UE whether an SPS occasion is cancelled or will be used for transmission. The BS may also transmit to the UE (e.g., via DCI) the occasion-identification parameters.

In some aspects, the BS may preconfigure the UE with a set of bitmaps, then signal to the UE which bitmap of the set to apply to a cancellation or activation window using an index. For instance, the occasion-identification parameters may include a configuration including a set of one or more bitmaps (transmitted, e.g., via RRC or MAC-CE), where each bit of a bitmap in the set indicates whether an SPS occasion corresponding to the bit is to be cancelled or to be used for transmission based on the occasion-identification mode, similar to what is described above. If the occasion-identification mode is set to identify empty (that is, cancelled) occasions, a 1 in the bitmap may indicate an empty occasion, and a 0 in the bitmap may indicate a non-empty occasion. Alternately, if the occasion-identification mode is set to identify non-empty occasions (occasions to be used for transmission), a 1 in the bitmap may indicate a non-empty occasion, and a 0 in the bitmap may indicate an empty occasion. In some aspects, the meaning of 0 and 1 may be reversed. The bitmap may be applicable to a window including a number of SPS occasions. The window may be referred to as a cancellation window if the bits indicate empty occasions, or an activation window if the bits indicate non-empty occasions. The length of the bitmap corresponds to the length of the window. For example, with the occasion-identification mode set to identify empty occasions and a window size (e.g., a cancellation window size) of 4, the bitmap "0100" would indicate that the first occasion is non-empty, the second occasion is empty, and the third and fourth occasions are non-empty. The set of bitmaps may be generated based on a traffic pattern. For example, for a traffic pattern where the BS will perform DL transmissions on more occasions than it cancels (e.g., where a large amount of data is to be transmitted), the generated bitmaps may include more 0s than 1s (if 1 indicates a cancelled occasion). Conversely, for a traffic pattern where the BS will cancel more occasions than those it will perform DL transmissions on (e.g., where a small amount of data is to be transmitted), the generated bitmaps may include more 1s than 0s (if 1 indicates a cancelled occasion).

The BS may then transmit a bitmap index (e.g., via DCI) to the UE indicating a first bitmap of the set of one or more bitmaps to apply to a window (e.g., a cancellation or activation window) following the transmission of the index. For a set of bitmaps containing M bitmaps, the BS may indicate the bitmap index using log 2(M) bits. For example, for a set of bitmaps containing 4 bitmaps, the BS may indicate the bitmap index using 2 bits. In some aspects, the BS may select the first bitmap based on a traffic pattern. For example, in low-traffic scenarios, the BS may select a bitmap from the set that indicates more cancelled occasions than it would in high-traffic scenarios. In some aspects, when the occasion-identification mode indicates the one or more occasion-identification parameters identify SPS occasions to be used for transmission, the BS may transmit a data signal (e.g., via PDSCH) in a first SPS occasion corresponding to a first bit of the first bitmap, where the first bit is set to 1 (e.g., where 1 indicates a non-empty occasion). In some aspects, where the occasion-identification mode indicates the one or more occasion-identification parameters identify SPS occasions to be cancelled, the BS may refrain from transmitting a data signal in a first SPS occasion corresponding to a first bit of the first bitmap, where the first bit is set to 1 (e.g., where 1 indicates an empty occasion).

In some aspects, the BS may transmit to the UE (e.g., via RRC or MAC-CE) an indication of a number of time periods (e.g., the number of cancellation or activation windows) to which a first bitmap in the set of one or more bitmaps applies. For example, the BS may indicate that a bitmap is to be applied for up to four cancellation windows. The UE may then assume it can reuse the bitmap indicated by the bitmap index up to four times if the BS does not transmit a new bitmap index indicating otherwise.

In some aspects, the BS may transmit a signal to the UE indicating whether an occasion following the signal is cancelled or whether it will be used for transmission. For instance, the occasion-identification parameters transmitted by the BS may include an occasion marker identifying whether a first SPS occasion following the occasion marker is to be cancelled or to be used for transmission based on the occasion-identification mode. For example, if the occasion-identification mode indicates the occasion-identification parameters identify SPS occasions to be used for transmission, then the next SPS occasion following the occasion marker is intended for transmission. If instead the occasion-identification mode indicates the occasion-identification parameters identify SPS occasions to be cancelled, the next SPS occasion following the occasion marker will be empty. In some aspects, the BS may transmit an indication of an offset associated with the occasion marker, where the first SPS occasion is offset relative to the occasion marker based on the offset associated with the occasion marker. For example, if the offset is configured to be 2 occasions, the transmission of the occasion marker would apply to the second SPS occasion occurring after the occasion marker.

In some aspects, the occasion marker may be transmitted explicitly as part of an SPS reactivation DCI message. For example, the SPS reactivation DCI message may include a field indicating the occasion marker. In some aspects, the occasion marker may be an SPS reactivation signal with a set of parameters unchanged from a previous SPS activation or reactivation signal. For example, the BS may transmit a first SPS reactivation signal including a first set of one or more configuration parameters, and transmit a second SPS reactivation signal including a second set of one or more configuration parameters with each configuration parameter of the second set having values equal to a corresponding configuration parameter in the first set. The SPS reactivation signal itself would then serve as the occasion marker.

In some aspects, the BS may transmit an index identifying (based on the occasion-identification mode) whether an SPS occasion is to be used for transmission or cancelled. The occasion-identification parameters transmitted by the BS may include an occasion index associated with a first SPS occasion. The occasion index may be included in an activation or reactivation DCI, and/or in a special DCI for transmitting the occasion index. The BS may determine, based on a traffic pattern, whether the first SPS occasion will be cancelled or used for transmission. The BS may transmit, to the UE, the occasion index based on determining the first SPS occasion will be cancelled and the occasion-identification mode indicating the one or more occasion-identification parameters identify SPS occasions to be cancelled. The BS may then refrain from transmitting a data signal in the first SPS occasion. For example, the BS may determine that the third SPS in a cancellation window (corresponding, for example, to occasion index 2 if using zero-based indexing) should be cancelled and transmit an occasion index with a value of 2 to the UE. The BS may then refrain from transmitting in the occasion with index 2. The BS may also transmit, to the UE, the occasion index based on determining the first SPS occasion will be used for transmission and the occasion-identification mode indicating that the one or more occasion-identification parameters identify SPS occasions to be used for transmission. The BS may then transmit, to the UE, a data signal in the first SPS occasion.

The BS then perform SPS transmission based on the mode indication and the one or more occasion-identification parameters. For example, when the occasion-identification mode indicates the one or more occasion-identification parameters identify SPS occasions to be used for transmission, performing the SPS transmission may include transmitting a data signal in SPS occasions identified by the one or more occasion-identification parameters. When the occasion-identification mode indicates the one or more occasion-identification parameters identify SPS occasions to be cancelled, performing the SPS transmission may include refraining from transmitting a data signal in SPS occasions identified by the one or more occasion-identification parameters.

Aspects of the present disclosure can provide several benefits. For example, preconfiguring a set bitmaps of indicating whether SPS occasions are cancelled or will be used for transmission, then transmitting an index indicating which bitmap is applicable to an upcoming window, may reduce the number of bits used in DCI transmissions compared to transmitting an entire bitmap prior to a window. Since the set of bitmaps can be transmitted over RRC or MAC-CE, each bitmap can be longer than if the bitmap were transmitted over DCI, which may allow a BS to provide indications about SPS occasions over longer windows. Transmitting occasion markers prior to specific occasions and/or transmitting occasion indices similarly may eliminate much of the overhead involved in transmitting bitmaps in DCI messages to indicate whether SPS occasions are to be used for transmission or cancelled. Since these aspects may reduce resource utilization, power savings may also be realized at the UE over existing methods when a BS employs SPS for DL transmissions.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the networks 100 may operate over a licensed band. A BS 105 may configure a UE 115 with configured grant resources for autonomous UL data transmission. The configured grant resources may be repeated at a certain time interval. The UE 115 may use the configured grant resources for UL HARQ data transmission without being scheduled dynamically by the BS 105. Each configured grant resource may include a set of consecutive transmission slots or time periods. The BS 105 may configure the UE with a set of redundancy version number (RVNs). The UE 115 may determine an order for mapping the configured RVNs to the set of slots or transmission periods. The UE 115 may transmit one or more redundancy versions of a TB in consecutive slots or time periods within a configured grant resource. The UE 115 may also prioritize HARQ processes and/or TBs for transmissions in the configured grant resources.

In some aspects, a BS 105 may preconfigure a UE 115 with an CS-RNTI and a periodicity for an SPS-based schedule (e.g., an SPS configuration). Once pre-configured, the UE 115 may monitor for an UL or DL allocation using the CS-RNTI. The BS 105 may activate the SPS configuration by transmitting a PDCCH DCI message with a CRC scrambled with the CS-RNTI. The PDCCH DCI message may indicate a resource allocation and transmission parameters, such as an MCS. Once activated, the resource allocation is repeated according to the preconfigured periodicity. Accordingly, the UE 115 may receive the activation including the resource allocation and transmission parameters based on the CS-RNTI. The UE 115 may continue to utilize the resource allocation according to the periodicity. For instance, if the SPS configuration is for UL communications, the UE may transmit an UL data packet in any of the SPS resources. Alternatively, if the SPS configuration is of DL communications, the UE may monitor for a DL packet in each of the SPS resources.

In some aspects, the network 100 may support time-sensitive communication (TSC) traffic, such as traffic from IoT and/or IIoT applications, where the network 100 may communicate with IoT devices or IIoT devices (the UEs 115) frequently. For instance, the network 100 may transmit commands to control the operations of the UEs 115. The DL communications may be frequent and the packet size may be small (e.g., a few bytes to tens of bytes). Due to the frequency of the TSC traffic and the small packet size, it may not be suitable for dynamic scheduling. As such, the BS 105 may utilize SPS-based schedules for DL communications with the UEs 115.

According to aspects of the present disclosure, the BS 105 may indicate to the UE 115 whether an SPS occasion is to be used for transmission or to be cancelled (e.g., so that the UE 115 may avoid performing decoding and/or transmitting an HARQ ACK/NACK feedback for an empty SPS occasion). For instance, the BS 105 may transmit an SPS configuration to the UE 115 corresponding to a number of SPS occasions. The BS may then transmit a mode indication indicating whether the BS will identify empty (or cancelled) SPS occasions or SPS occasions to be used for transmission, and one or more occasion-identification parameters that identify occasions based on the occasion-identification mode.

Figure 2:
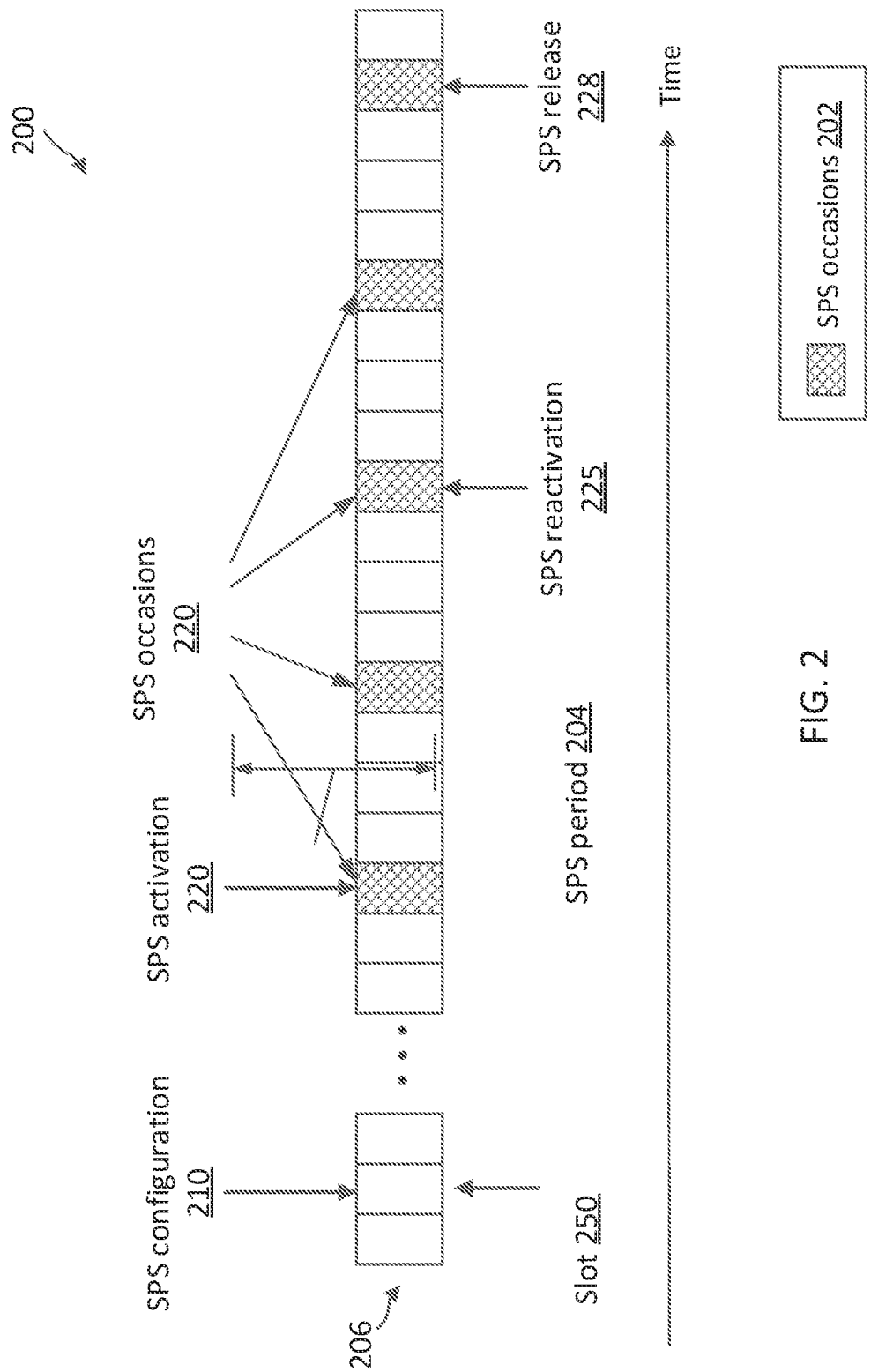
FIG. 2 illustrates a semi-persistent scheduling (SPS)-based communication scenario according to some aspects of the present disclosure.

FIG. 2 illustrates an SPS-based communication scenario 200 according to some aspects of the present disclosure. The x-axis represents time in some arbitrary unit. The scenario 200 can include a frame structure 206 that may be employed by a BS (such as BS 105) for the transmission of data to a UE (such as UE 115) in a network (such as the network 100) using SPS resources. The frame structure 206 may include multiple slots 250.

In the scenario 200, a BS 105 may configure a UE 115 with an SPS configuration 210, for example, via RRC signaling. The SPS configuration 210 may indicate a periodicity (e.g., shown by the SPS period 204) for an SPS-based schedule and a CS-RNTI. In some instances, when HARQ is applied, the SPS configuration 210 may also indicate a HARQ ID identifying a HARQ process associated with the SPS configuration. To activate the SPS configuration 210, the BS 105 may transmit an SPS activation 220, for example, via a DCI message. The BS 105 may include in the DCI message a CRC scrambled with the CS-RNTI. The SPS activation 220 may indicate a number of SPS occasions (e.g., PDSCH occasions), which are time-frequency resources (e.g., certain RB(s) in certain symbol(s) within a certain slot 250). The SPS activation 220 may also indicate transmission parameters (e.g., MCS, antenna port information, resource block allocation information, etc.) to be used for the SPS transmissions. Once activated, the SPS occasions 202 are repeated according to the periodicity configured by the SPS configuration 210. As it may not be necessary for the BS 105 to transmit a PDSCH scheduling grant per transmission, SPS-based scheduling can reduce scheduling overhead.

In the illustrated example of FIG. 2, the SPS occasions 202 associated with the configuration 210 are shown by the patterned filled boxes. The SPS occasions 202 are periodic, repeating at every SPS period 204 (e.g., about four slots 250). In some instances, the SPS occasions 202 may also be referred to as SPS resources, time-frequency resources, or SPS instances. Although FIG. 2 illustrates the SPS configuration 210 configures an SPS schedule periodicity of four slots 250, it should be understood that in other examples an SPS schedule can have a shorter period or a longer period. The SPS configuration 210 may be configured for DL communications. Accordingly, the BS 105 can transmit a data transmission 220 (e.g., PDSCH transmission) to the UE 115 at each SPS occasion 202, and the UE 115 can monitor for a data transmission from the BS 105 in each of the SPS occasions 202. The monitoring may include performing blind packet decoding for data received at each SPS occasion 202.

The BS 105 may transmit an SPS reactivation 225 to reconfigure parameters (e.g., MCS, antenna port information, resource block allocation information, etc.) included in the SPS activation 220. The SPS reactivation 225 may include new values for the parameters, applicable to SPS occasions 202 that follow the SPS reactivation 225. The BS 105 may terminate the SPS schedule by transmitting an SPS release 228 to the UE 115. Upon receiving the SPS release 228, the UE 115 will cease monitoring the SPS occasions 202 indicated by the SPS configuration 210.

As discussed above, in some applications, such as IIoT applications, many devices (e.g., UEs 115) may be controlled by a network (e.g., network 100) with frequent, small-sized packets. To save on control channel signaling overhead (PDCCH DCI signaling overhead), a BS 105 may utilize SPS-based scheduling as shown in the scenario 200 to support these applications. However, not every SPS occasion 202 monitored by the UE 115 may actually be used. The BS 105 may refrain from transmitting DL data during some of the monitored SPS occasions 202, for example, based on traffic and/or the volume of data to be transmitted. The UE 115 may not always be aware of whether a specific SPS occasion was intended to contain DL data, as illustrated by FIG. 3.

Figure 3:
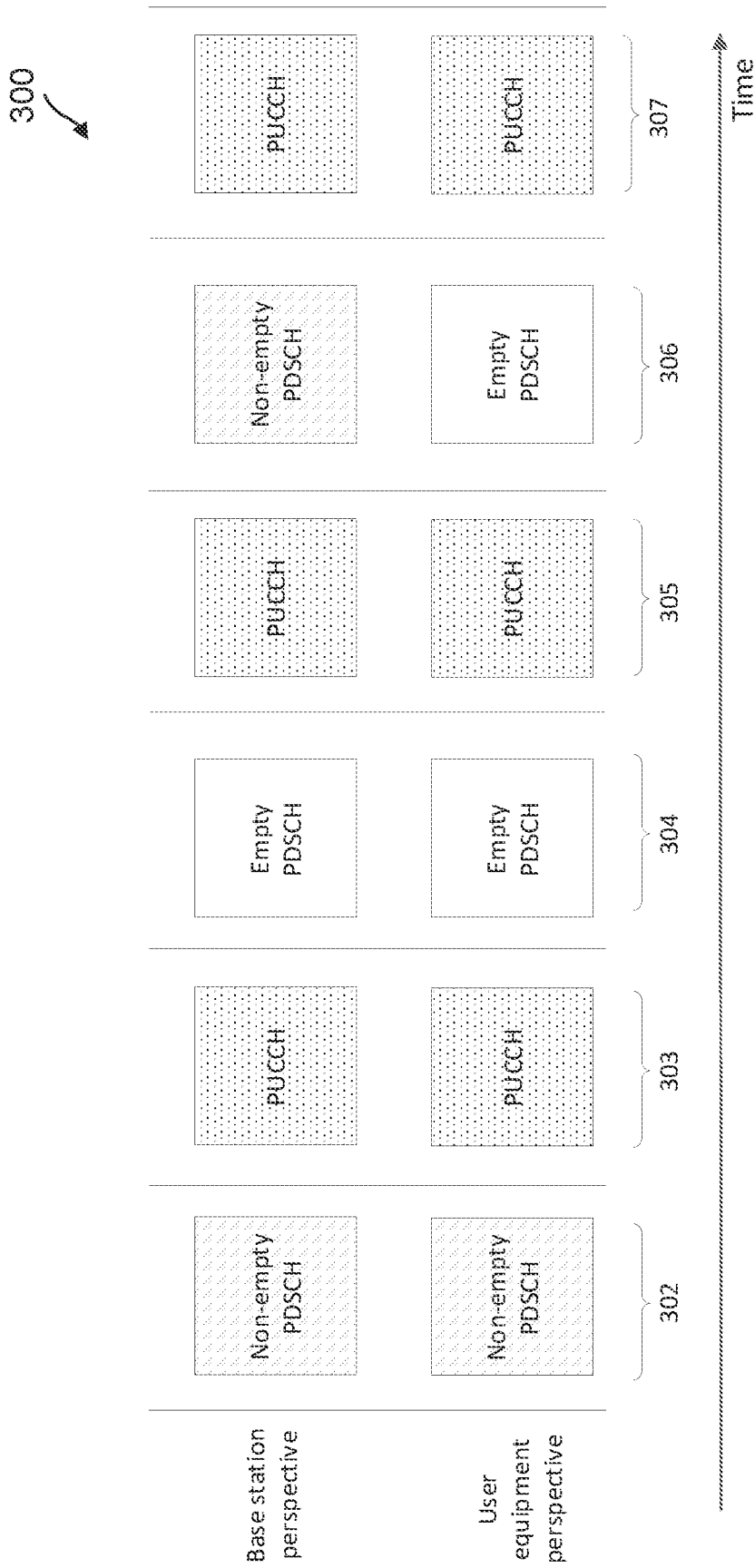
FIG. 3 illustrates an SPS-based communication scenario according to some aspects of the present disclosure.

FIG. 3 illustrates an SPS-based communication scenario 300 according to some aspects of the present disclosure. In FIGS. 3-6, non-empty occasions (e.g., occasion 302) are illustrated with a diamond-patterned fill, and empty occasions (e.g., occasion 304) are illustrated with no fill pattern. In FIG. 3, the horizontal axis represents time in some arbitrary units. Scheduling scenario 300 illustrates the same traffic pattern from the perspective of a BS 105 and a UE 115. SPS PDSCH occasions (also referred to as SPS occasions or simply occasions throughout this disclosure) 302, 304, and 306 (which may be SPS occasions 202) may be used for transmitting DL data and are followed by PUCCH occasions 303, 305, and 307, respectively, which may be used for transmitted HARQ feedback. In some aspects, the BS 105 may configure the UE 115 with PUCCH occasions 303, 305, and 307 via configured UL grant and/or a dynamic scheduling grant. For example, PUCCH occasion 303 may be used to transmit HARQ feedback related to SPS PDSCH occasion 302, PUCCH occasion 305 may be used to transmit HARQ feedback related to SPS PDSCH occasion 304, and PUCCH occasion 307 may be used to transmit HARQ feedback related to SPS PDSCH occasion 306. In scenario 300, BS 105 transmits and UE 115 receives DL data in SPS PDSCH occasion 302, as expected. In other words, SPS PDSCH occasion 302 is non-empty. UE 115 may then decode the DL data and provide HARQ feedback to the BS 105 using PUCCH occasion 303. For example, UE 115 may transmit an ACK to the BS 105 in occasion 303 if it was able to successfully decode the DL data, or a NACK otherwise. In some aspects, discontinuous transmission (DTX) may be used, and the BS 105 may indicate to the UE 115 that one or more SPS occasions will not be used to transmit data, allowing the UE 115 to skip monitoring the cancelled (also referred to as empty) occasions. Following a cancelled occasion, the UE 115 may send a dummy NACK or skip transmission of a NACK (depending on the configuration transmitted by the BS 105).

One issue with SPS-based DL communications is that UE 115 is unable to distinguish between an empty SPS PDSCH occasion and an SPS transmission with errors. For instance, the BS 105 may refrain from transmitting data in an SPS PDSCH occasion, for example, depending on traffic conditions or the amount of data to be transmitted. In scheduling scenario 300, BS 105 has cancelled transmission of DL data on SPS PDSCH occasion 304. In other words, SPS PDSCH occasion 304 is empty. However, UE 115 is unaware that the SPS PDSCH occasion 304 is empty. As a result, UE 115 attempt to decode what it believes to be DL data in the PDSCH occasion 304, which will result in a decoding failure, and send unnecessary HARQ feedback in the subsequent PUCCH occasion. However, in some instances, BS 105 may transmit data in an SPS PDSCH occasion, which may not be properly received and decoded by the UE. For example, BS 105 may transmit DL data in SPS PDSCH occasion 306, but due to obstructions between the BS 105 and the UE 115, environmental conditions, or other source of error, UE 115 may fail data decoding. To UE 115, SPS PDSCH occasion 306 incorrectly appears empty, which may cause UE 115 to improperly refrain from transmitting HARQ feedback (e.g., a NACK) in PUCCH occasion 307. To mitigate these problems, a BS 105 may indicate to a UE 115 which SPS occasions will be used for transmission (also referred to as non-empty SPS occasions), and which SPS occasions will be cancelled (also referred to as empty SPS occasions).

Figure 4:
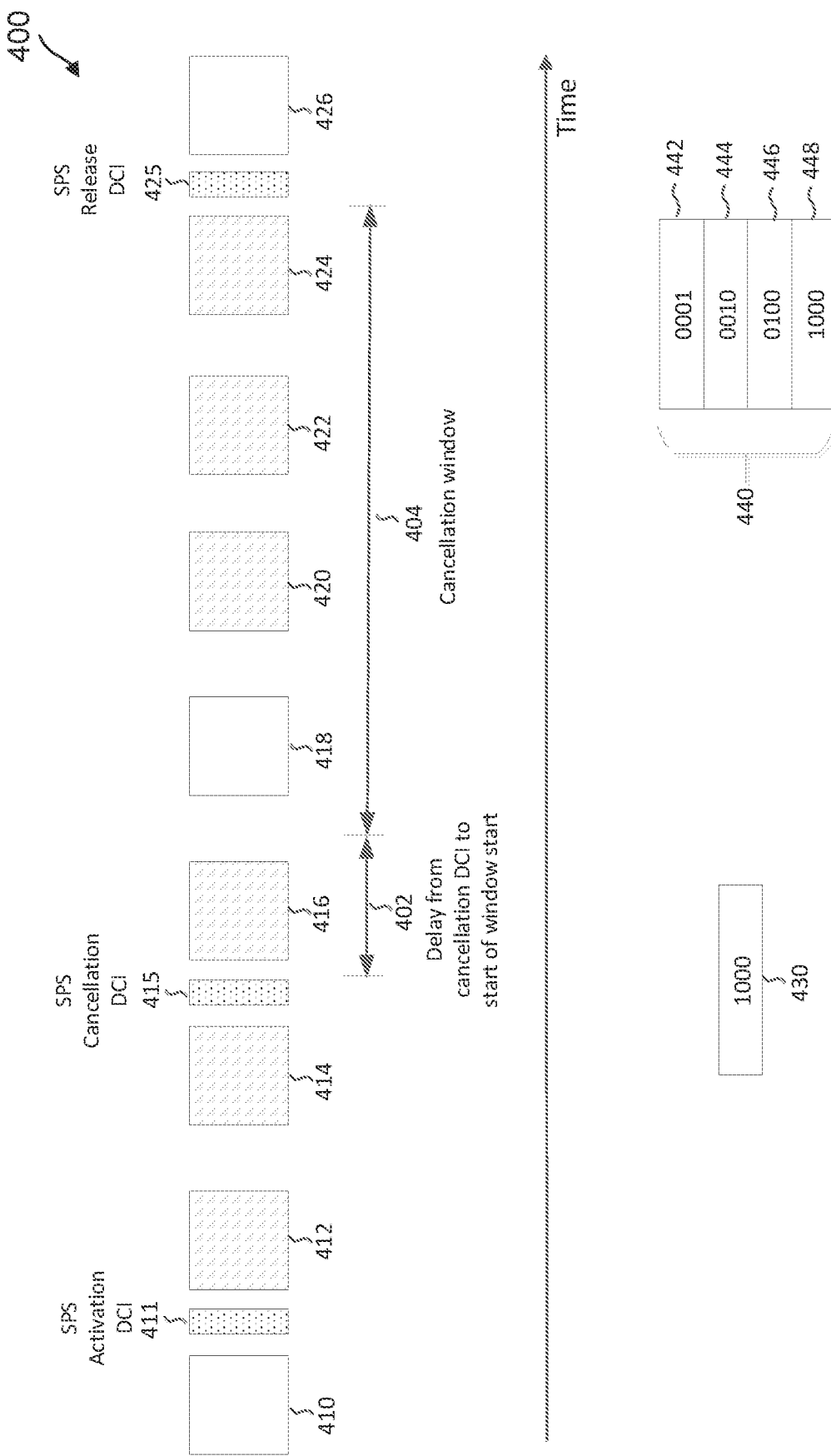
FIG. 4 illustrates an SPS transmission indication scheme according to some aspects of the present disclosure.

FIG. 4 illustrates an SPS transmission indication scheme 400 according to some aspects of the present disclosure. The scheme 400 may be employed by a BS (such as BS 105) and a UE (such as UE 115) for DL communications in a network (such as network 100) using SPS resources. In FIG. 4, the horizontal axis represents time in some arbitrary units. Illustrated in FIG. 4 are SPS PDSCH occasions 410, 412, 414, 416, 418, 420, 422, 424, and 426, in addition to SPS activation DCI 411, SPS cancellation DCI 415, and SPS release DCI 425.

In scheme 400, the BS 105 has configured the UE 115 for SPS communication by transmitting an SPS configuration indicating the SPS PDSCH occasions 410, 412, 414, 416, 418, 420, 422, 424, and 426. UE 115 does not monitor for DL data at occasion 410, as the BS 105 has not yet transmitted an SPS activation signal at the time corresponding to the occasion 410. Following occasion 410, BS 105 transmits an SPS activation DCI 411, prompting UE 115 to begin monitoring subsequent SPS occasions (e.g., occasions 412 and 414). Following occasion 414, BS 105 transmits SPS cancellation DCI 415, indicating BS 105 may cancel one more occasions (e.g., occasions 418 and 424 following the SPS cancellation DCI 415) during a cancellation window 404, the length of which may be indicated in the SPS cancellation DCI 415 or pre-configured (e.g., through RRC). There may be a delay 402 between the transmission of the SPS cancellation DCI 415 and the start of the cancellation window 404. For example, occasion 416 is outside the cancellation window. Following SPS occasion 424, the BS 105 transmits SPS release DCI 425, indicating the BS will not transmit further SPS data unless and until it transmits another SPS activation DCI. UE 115 may then refrain from monitoring occasion 426 and subsequent occasions.

The BS 105 may indicate which occasions 418, 420, 422, and 424 of the cancellation window 404 are cancelled and/or to be used to transmit DL data. For example, the BS 105 may use a bitmap 430 with a length equal to the number of SPS occasions in the cancellation window 404, where each bit set to 1 indicates a cancelled occasion and each bit set to 0 indicates an occasion that will be used for transmitting data. Note that the meaning of 1 and 0 may be reversed in in some aspects, with 1 indicating an occasion to be used for transmission and 0 indicating a cancelled occasion (the cancellation window may instead be referred to as an activation window in these aspects). The bitmap 430 may be transmitted as part of the SPS activation DCI 411, or as part of a different signal (e.g., a special DCI). As illustrated, bitmap 430 with bits 1000 indicates that the first occasion 418 of the cancellation window 404 is cancelled, and the rest of the occasions (420, 422, and 424) of the cancellation window will be used for transmitting data.

Transmitting a bitmap 430 before every cancellation window 404 may be inefficient, particularly as the desired size of the cancellation window 404 increases. For example, DCI messages may not be well suited for the transmission of large bitmaps. In some aspects, BS 105 may more efficiently indicate the status of SPS occasions by transmitting a bitmap table 440 (e.g., via RRC) to the UE 115, then indicating to the UE 115 the index (e.g., via DCI) of the bitmap in the bitmap table 440 to apply to a given cancellation window. For example, the BS 105 may create the bitmap table 440 for the cancellation window 404, transmit the bitmap table 440 via RRC, then transmit (e.g., in the SPS cancellation DCI 415) the index of the bitmap to apply. In some aspects, BS 105 may determine the entries in bitmap table 440 based on a traffic pattern. For example, during periods of heavy traffic, where much data needs to be transmitted, the BS may determine it is likely only one out of four SPS occasions will be cancelled and create bitmap table 440, with each bitmap 442, 444, 446, and 448 indicating the SPS occasion to be canceled. If bitmap table 440 is configured with the first bitmap 442 having index 0 and the final bitmap 448 having index 3, BS 105 may transmit the index (3) of bitmap 448 to the UE 115, for example, as the two bits 11 in the SPS cancellation DCI 415 (or in a different DCI message). Using this approach, the BS 105 may indicate the bitmap to be applied using log 2(N) bits, where N is the number of occasions in the cancellation window. For example, for cancellation window 404 that includes 4 occasions (418, 420, 422, and 424), the BS may indicate the index using two bits (e.g., 11 to indicate bitmap 448 with an index of 3) instead of four bits as in the bitmap 430. The size of the window to which a bitmap 448 corresponds may be a function of the ability of the scheduler at the BS 105 to determine traffic patterns, and the number and length of bitmaps the BS may be determined (e.g., based on a certain RRC/MAC-CE signaling overhead, memory constraint, and/or cost). For instance, a bitmap table including a short bitmap may include all combinations or close to all combinations of bit patterns, while a bitmap table including a long bitmap may include a smaller subset of all combinations of bit patterns, for example, to maintain a minimal signaling overhead and/or memory utilization at the BS and/or the UE. Accordingly, a bitmap table with a large number of bitmaps and/or shorter bitmaps may provide the BS 105 with a selection of bitmaps more likely to reflect traffic conditions that bitmap table with a small number of bitmaps and/or longer bitmaps.

In some aspects, the BS 105 may transmit to the UE 115 (e.g., in the SPS configuration) an indication of a number of time periods (e.g., the number of cancellation windows) to which a bitmap applies. For example, the BS 105 may indicate that the bitmap 448 is to be applied for up to four cancellation windows. The UE 115 may then assume it can reuse bitmap 448 up to four times if the BS 105 does not transmit a new bitmap index indicating otherwise. The BS 105 may select a new bitmap from the bitmap table 440 and transmit its corresponding index to the UE 115 when traffic conditions change. In some aspects, there may be a period of time between windows before the BS 105 transmits a new bitmap index, and the UE 115 may monitor all occasions during that period.

When selecting a bitmap from the table 440, the BS 105 will select the bitmap that most closely corresponds to the pattern of upcoming traffic (e.g., the upcoming sequence of transmissions), prioritizing the accurate indication of non-empty occasions. In other words, when the BS 105 is unable to select a bitmap that exactly matches the pattern of upcoming sequence of transmissions, the BS 105 will attempt to select a bitmap that correctly identifies all non-empty occasions, even if the resulting bitmap incorrectly identifies empty occasions as being non-empty. The UE 115 may then monitor all non-empty occasions. When encountering an empty occasion that was incorrectly identified as being non-empty by the bitmap, the UE 115 may attempt to decode any data observed during the empty occasion (e.g., as a result of a lower power signal) and send a NACK to the BS 105 when it fails to decode the data, or determine the occasion was actually empty as a result.

In some instances, the BS 105 may be unable to select a bitmap from the table 440 that correctly identifies all non-empty occasions. For example, the table 440 may not include a bitmap that exactly matches the upcoming traffic pattern. In such cases, the BS 105 may indicate to the UE 115 (e.g., through RRC, MAC-CE, or DCI) that it should monitor all occasions in the window corresponding to the bitmap, even occasions that have been identified by the bitmap as being empty. The UE 115 may then attempt to decode any data in the occasions identified as being empty and provide HARQ feedback to the BS 105, transmitting an ACK if it was able to decode the data or a NACK otherwise. In some instances, when the BS 105 selects a bitmap that correctly identifies all empty and non-empty occasions, the BS 105 may indicate to the UE 115 (e.g., through RRC, MAC-CE, or DCI) that it may refrain from monitoring occasions that have been identified by the bitmap as being empty. The indication may then identify whether the bitmap selected by the BS 105 correctly identifies all non-empty occasions in an upcoming window (so that the UE 115 may refrain from monitoring occasions identified in the bitmap as being empty) or not (so that the UE 115 may monitor all occasions in the window, even those identified as being empty by the bitmap). In some instances, if the differences between the bitmaps in the table and the upcoming sequence of transmissions is too great (e.g., if the mismatches between the bitmap and the upcoming sequence are above a threshold), the BS 105 may halt the use of bitmaps to indicate the status of the occasions and transmit an indication (e.g., through RRC, MAC-CE, or DCI) to the UE 115 notifying the UE 115 that use of bitmaps to identify the status of occasions is suspended.

For example, assume the actual status of the upcoming occasions will be non-empty, empty, empty, non-empty, empty, empty, non-empty, non-empty, non-empty, non-empty, empty, empty, empty. Assuming 0 represents empty occasions and 1 represents non-empty occasions, the bitmap perfectly matched to the sequence of occasions would be 1001001111000. If the table of bitmaps does not include the perfectly-matched bitmap, the BS 105 may attempt to select the best-matching bitmap from the table, prioritizing first the selection of a bitmap that correctly identifies all non-empty occasions, then from those bitmaps (if any), the one with the greatest number of correctly-identified empty occasions. For example, the BS 105 may select 1001001111001 over 1001001111011. While both correctly identify all non-empty occasions, the first bitmap incorrectly identifies only one occasion (the final occasion) as being non-empty, while the second bitmap incorrectly identifies two occasions (the final two occasions) as being non-empty. The BS 105 may then transmit an indication to the UE 115 notifying the UE 115 that it may refrain from monitoring locations identified as being empty, since at worst, the UE 115 will unnecessarily monitor one occasion (the final one) and attempt to decode data in that location when no data was actually transmitted. If, however, the BS 105 is unable to select a bitmap from the table that correctly identifies all non-empty locations, e.g., the bitmap 0001001111000 (which incorrectly identifies the first occasion as being empty), the BS 105 may transmit an indication notifying the UE 115 that it should monitor all occasions, even those identified as being empty by the bitmap.

As described above, in the scenario where the selected bitmap correctly identifies all non-empty occasions but misidentifies one or more empty occasions, the UE 115 will monitor all occasions, even the ones identified as being empty. When attempting to decode data in a location misidentified as being non-empty, the UE 115 may either fail to decode the data and transmit a NACK as feedback to the BS 105, or the UE 115 may determine the occasion was actually empty (e.g., because of a very low-energy signal) and skip transmission of the NACK or send a dummy NACK. Whether the UE 115 transmits a dummy NACK or skips transmission of the NACK (saving energy at the UE 115) may be configured by the BS 105 (e.g., through RRC or MAC-CE).

In some aspects, the BS 105 may configure (e.g., via RRC or MAC-CE) the UE 115 to vary how it transmits HARQ feedback based on the status of an occasion (empty or non-empty) and what was indicated in the bitmap. For example, the BS 105 may configure the UE 115 to skip transmission of a NACK when the bitmap indicates an empty occasion and the UE 115 detects the occasion was actually empty. The BS 105 may also configure the UE 115 to transmit an ACK or NACK when the bitmap indicates that an occasion is non-empty, whether the occasion is actually non-empty or not. The BS 105 may also configure the UE 115 to skip transmission of HARQ feedback when the UE 115 detects DTX (instead of a decoding failure). For example, the UE 115 may skip transmission of HARQ feedback to indicate a DTX.

The UE 115 may save energy whenever the bitmap selected by the BS 105 correctly identifies all non-empty occasions and at least some empty occasions, since the UE 115 may refrain from monitoring the indicated empty occasions. While the UE 115 will not realize any energy savings when the selected bitmap does not correctly identify all non-empty occasions (and the BS 105 sends an indication to the UE 115 that results in the UE 115 monitoring all occasions), there are benefits to the approach described here even if the UE 115 monitors all occasions. For example, even if only some non-empty occasions are identified, if decoding of data at any of those occasions fail, the UE 115 may be better able to determine that the failed decoding was the result of beam blocking or deep fading channels. Additionally, when the UE 115 monitors an occasion identified by the bitmap as being empty and decoding of data at the occasion fails, the UE 115 may have greater confidence in a determination that the occasion was actually empty (rather than that the UE 115 failed to receive data because of beam blocking or another error).

Figure 5:
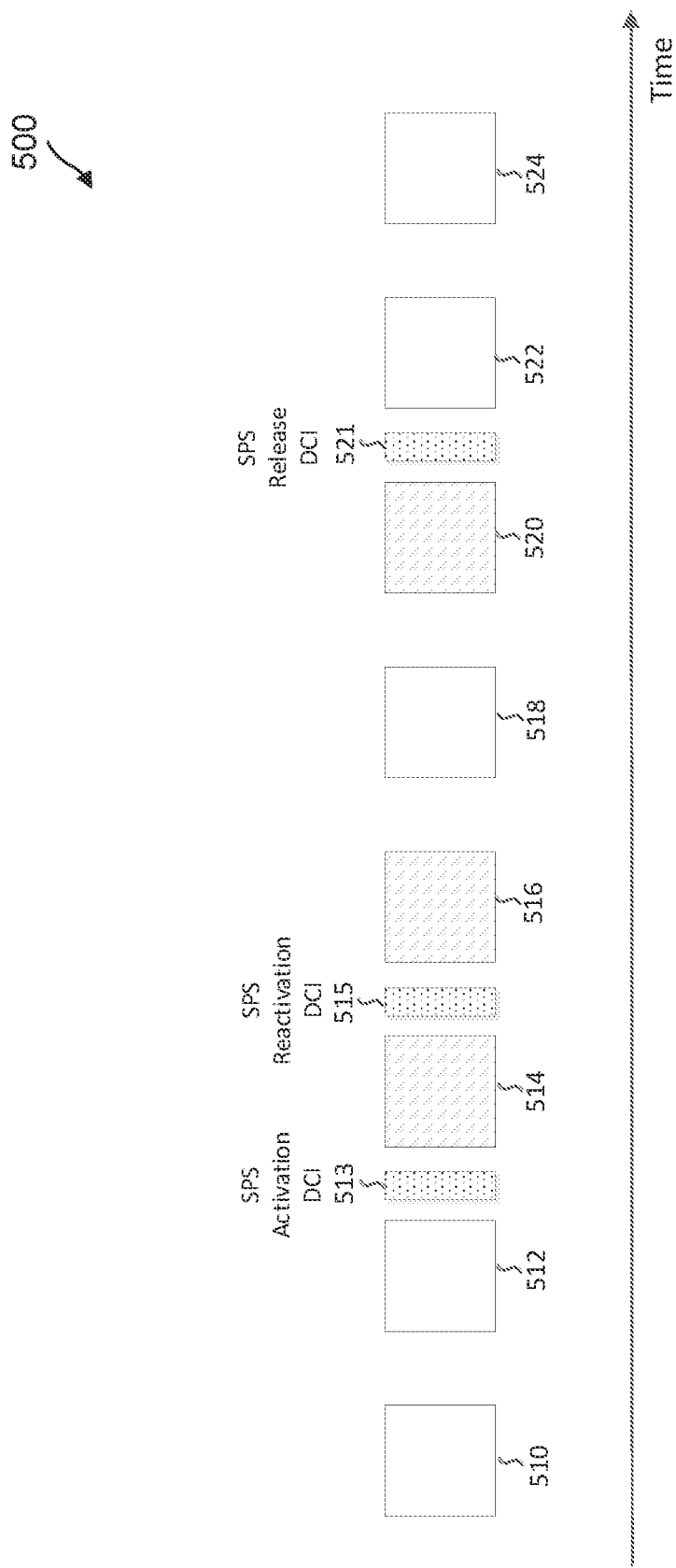
FIG. 5 illustrates an SPS transmission indication scheme according to some aspects of the present disclosure.

FIG. 5 illustrates an SPS transmission indication scheme 500 according to some aspects of the present disclosure. The scheme 500 may be employed by a BS (such as BS 105) and a UE (such as UE 115) for DL communications in a network (such as network 100) using SPS resources. In FIG. 5, the horizontal axis represents time in some arbitrary units. Illustrated in FIG. 5 are SPS PDSCH occasions 510, 512, 514, 516, 518, 520, 522, and 524 (configured by BS 105 via an SPS configuration transmitted to the UE 115) in addition to SPS activation DCI 513, SPS reactivation DCI 515, and SPS release DCI 521. SPS occasions 510 and 512 occur before the SPS activation DCI 513 is transmitted by the BS 105, and SPS occasions 522 and 524 occur after the SPS release DCI 521 is transmitted by the BS 105, and thus are not monitored by the UE 115.

In some aspects, BS 105 may transmit an occasion marker as part of the SPS reactivation DCI 515 identifying an occasion (e.g., occasion 518) as being either cancelled, or to be used for transmission. The example in scheme 500 assumes occasions to be cancelled are indicated, but the BS 105 may instead indicate occasions to be used for transmission. Which type of occasion is indicated by the occasion marker may be based on traffic conditions. For example, during periods of high traffic, the BS 105 may be configured to indicate cancelled occasions (as they would be less frequent), while during periods of low traffic, the BS 105 may be configured to indicate occasions to be used for transmission (as they would be less frequent). The occasion to be cancelled may immediately follow the occasion marker, or as illustrated in FIG. 5, may be offset from the occasion marker. For example, BS 105 may indicate to the UE 115 (e.g., through RRC or MAC-CE, or in a DCI message) that an offset of 1 occasion should be applied to the occasion marker to determine the occasion to which the marker applies.

In the example of FIG. 5, the BS 105 indicates through SPS reactivation DCI 515 that occasion 518 (with an offset of 1 from the occasion marker in SPS reactivation DCI 515) is cancelled. The occasion marker may be explicitly included in SPS reactivation DCI 515 (e.g., as a single bit indicating a subsequent SPS occasion will be cancelled, which may be based on an offset transmitted earlier or indicated in the SPS reactivation DCI 515), or it may be communicated explicitly. For example, if none of the parameters (or none of the parameters of an agreed-upon subset of parameters) included in SPS activation DCI 513 have new values included in SPS reactivation DCI 515, UE 115 may assume the SPS reactivation DCI 515 itself is the occasion marker. Based on a previously communicated offset of 1, the UE 115 may determine that SPS occasion 518 is cancelled. Any number of subsequent SPS reactivation DCIs with parameters unchanged from SPS reactivation DCI 515 may similarly serve as occasion markers.

Figure 6:
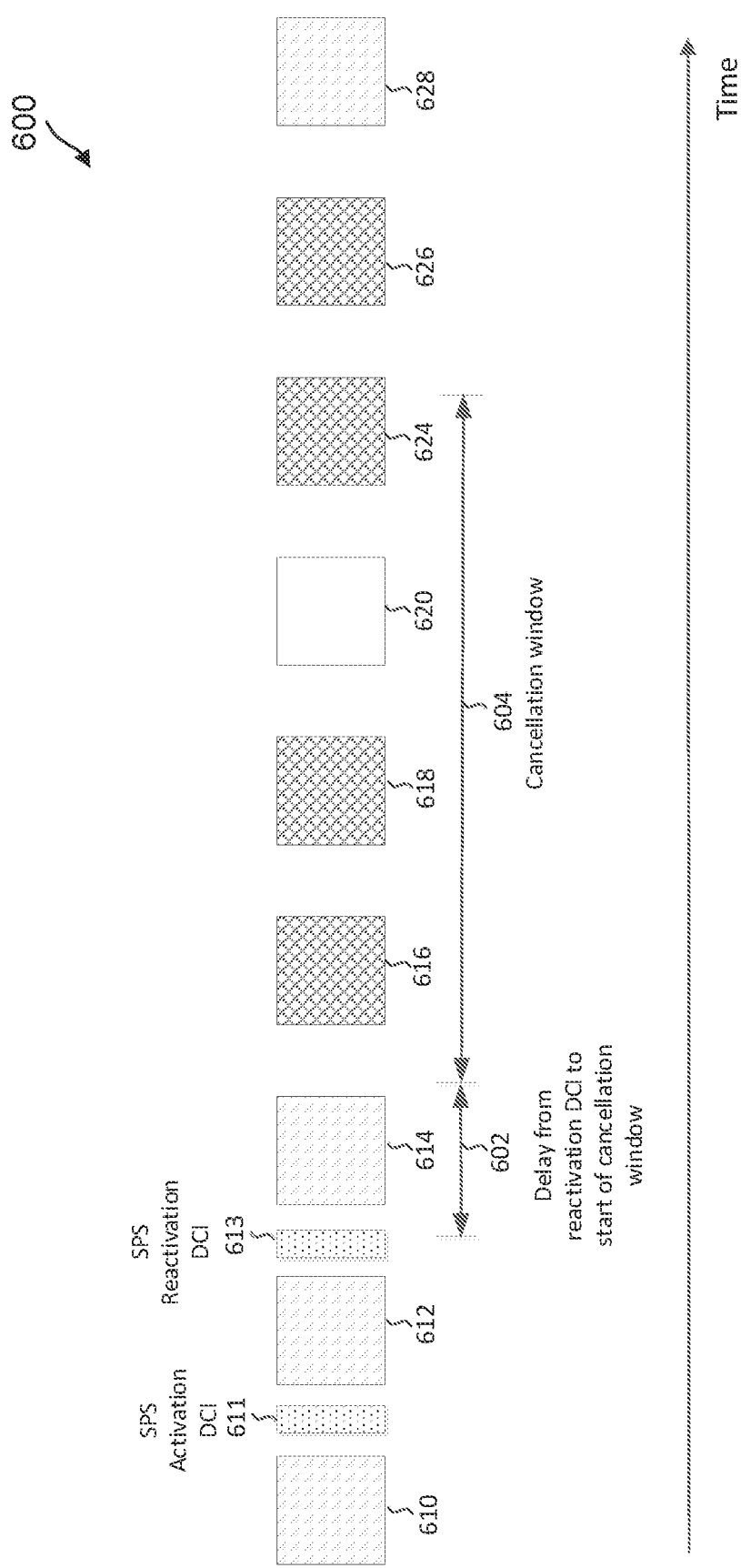
FIG. 6 illustrates an SPS transmission indication scheme according to some aspects of the present disclosure.

FIG. 6 illustrates an SPS transmission indication scheme 600 according to some aspects of the present disclosure. The scheme 600 may be employed by a BS (such as BS 105) and a UE (such as UE 115) for DL communications in a network (such as network 100) using SPS resources. In FIG. 6, the horizontal axis represents time in some arbitrary units. Illustrated in FIG. 6 are SPS PDSCH occasions 610, 612, 614, 616, 618, 620, 622, 624, 626, and 628 (configured by BS 105 via an SPS configuration transmitted to the UE 115) in addition to SPS activation DCI 611 and SPS reactivation DCI 613. SPS occasion 610 occurs before the SPS activation DCI 611 is transmitted by the BS 105 and thus is not monitored by the UE 115.

In scheme 600, the BS 105 may directly indicate to the UE 115 which occasions are cancelled (or alternately, which occasions will be used for transmission) by providing one or more indices identifying the cancelled occasions to the UE 115. For example, SPS reactivation DCI 613 (or a different DCI message) may include the indices. In the example of FIG. 6, SPS reactivation DCI 613 may an index corresponding to cancelled occasion 620. There may be a delay 602 between the transmission of the SPS reactivation DCI 613 and the beginning of the cancellation window 604 to which the indices transmitted in the SPS reactivation DCI 613 correspond. In FIG. 6, the cancellation window begins after occasion 614, so the BS 105 may transmit index 2 corresponding to cancelled occasions 620. In some aspects, the BS 105 may instead transmit the indices of occasions to be used for transmission, for example indices 0, 1, 3, and 4 corresponding to occasions 616, 618, 624, and 626. The BS 105 may determine whether to transmit the indices of occasions that are cancelled or to be used for transmission based on a traffic pattern. For example, where there are fewer cancelled occasions than occasions to be used for transmission as in FIG. 6, the BS 105 may transmit the indices of cancelled occasions and vice versa.

Using occasion indices to identify empty (or non-empty, depending on the occasion-identification mode) occasions as described here is preferable to transmitting a bitmap in the DCI to do the same when the number of bits required to identify the empty (or non-empty) occasions is less than the size of a bitmap required to do the same. For example, assuming a window size of 8 bits, an 8-bit bitmap would be required to identify the state (empty or non-empty) of each occasion, but only 3 bits would be required to indicate the index (e.g., an index between 0 and 7) of a single occasion within the window. To indicate 2 indices, 6 bits would be required, 3 bits for each index. If 3 indices are to be indicated, however, 9 bits are required (3 for each index), exceeding the size of the bitmap (8 bits) required to do the same. Accordingly, in this example, the occasion-index approach illustrated in FIG. 6 would be less preferable than using a bitmap to indicate the state of each occasion if the number of occasions to be identified is greater than 2. In general, for a window including M occasions with K occasions to be identified as empty (or non-empty, depending on the occasion-identification mode), the occasion-index approach is preferable to the bitmap approach when K*ceiling(log 2M)<=M, or stated in terms of the occasions to be identified, when K<=floor(M/ceiling(log 2M)).

In some aspects, a BS 105 may transition between SPS transmission indication schemes 400, 500, and 600, and/or combine elements of schemes 400, 500, and 600 when communicating with a UE 115. For example, the BS 105 may transition between transmitting bitmap tables and bitmap indices as described in scheme 400, occasion markers as described in scheme 500, and occasion indices as described in 600. The BS 105 may indicate which of schemes 400, 500, or 600 is being used by transmitting a configuration to UE 115 (e.g., through RRC or MAC-CE). The BS 105 may also combine elements of any of schemes 400, 500, and 600 to indicate the status (empty or non-empty) of SPS occasions. For example, the BS 105 may transmit bitmap tables and bitmap indices to indicate the status of SPS occasions as described in scheme 400, but supplement the indications by transmitting occasion markers as described in scheme 500 and/or occasion indices as described in scheme 600. This may be beneficial, for example, when a BS 105 practicing scheme 400 selects a bitmap from a bitmap table that does not exactly match the upcoming traffic pattern. The BS 105 may then configure the UE 115 to expect the traffic pattern indicated by the selected bitmap as described with respect to scheme 400, but the BS 105 may transmit occasion markers and/or occasion indices indicating the status of occasions for which the status does not match what is indicated by the selected bitmap.

Figure 7:
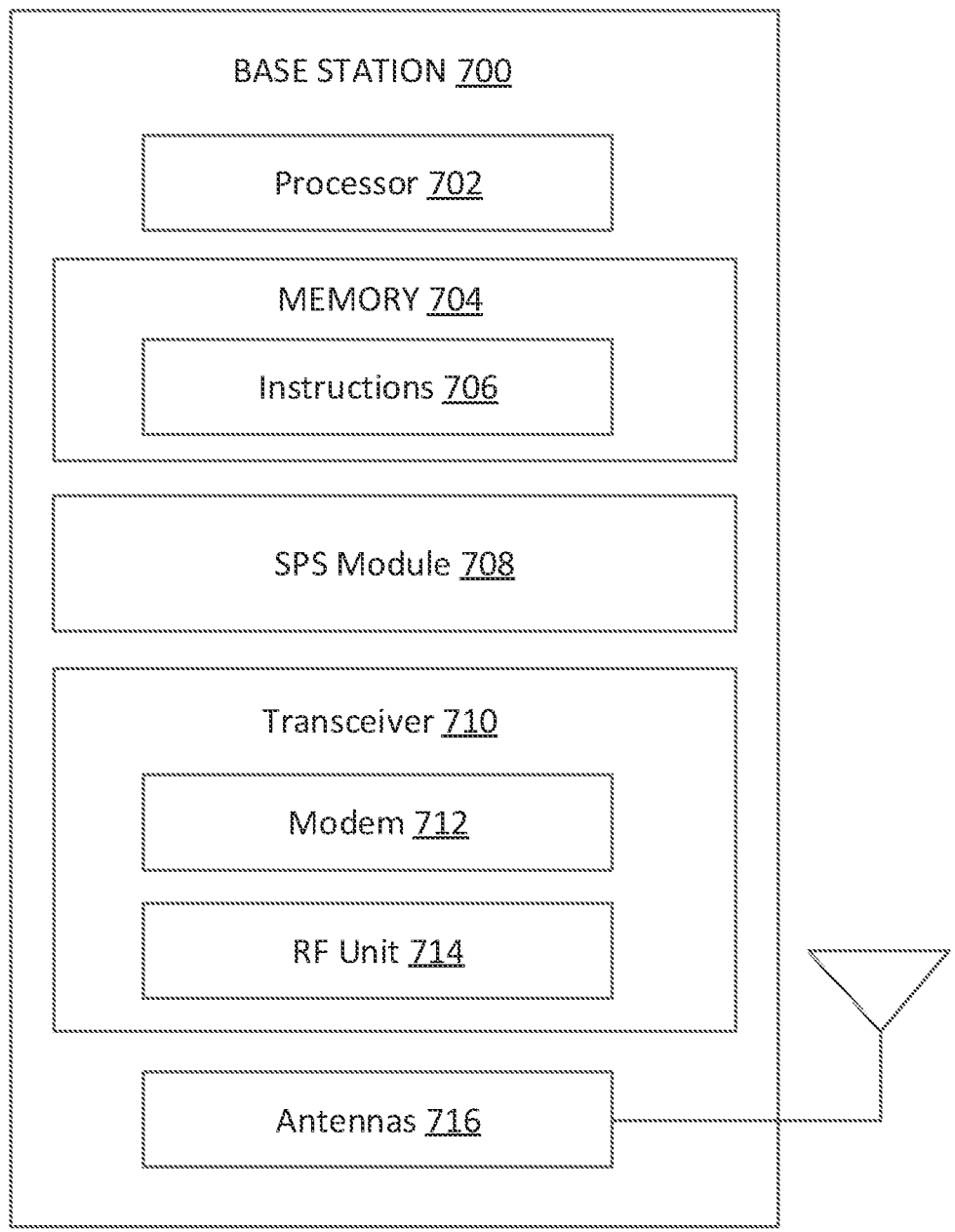
FIG. 7 illustrates a block diagram of a base station (BS) according to some aspects of the present disclosure.

FIG. 7 is a block diagram of an exemplary BS 700 according to some aspects of the present disclosure. The BS 700 may be a BS 105 as discussed in FIGS. 1-6 and 8-11. A shown, the BS 700 may include a processor 702, a memory 704, an SPS module 708, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 2-6, 9, and 11. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SPS module 708 may be implemented via hardware, software, or combinations thereof. For example, the SPS module 708 may be implemented as a processor, circuit, and/or instructions 706 stored in the memory 704 and executed by the processor 702. In some examples, the SPS module 708 can be integrated within the modem subsystem 712. For example, the SPS module 708 can be implemented by a combination of software components (e.g., executed by a DSP or a general processor) and hardware components (e.g., logic gates and circuitry) within the modem subsystem 712.

The SPS module 708 may communicate with one or more components of BS 700 to implement various aspects of the present disclosure, for example, aspects of FIGS. 2-6, 9, and 11.

For instance, the SPS module 708 may transmit, to a UE, an SPS configuration indicating a plurality of SPS occasions. The SPS occasions may be associated with PDSCH transmissions. The SPS configuration may be transmitted via RRC and include an indication of a periodicity for the SPS occasions (e.g., at what intervals the UE should monitor the PDSCH for DL transmissions).

SPS module 708 may be further configured to transmit, to the UE, a mode indication indicating an occasion-identification mode. The occasion-identification mode indicates whether one or more occasion-identification parameters identify SPS occasions to be cancelled (also referred to as empty occasions) or to be used for transmission (also referred to as non-empty occasions). SPS module 708 may be configured to determine that the number of SPS occasions to be cancelled is greater than a number of SPS occasions to be used for transmission and set that the occasion-identification mode to indicate that the occasion-identification parameters identify SPS occasions to be used for transmission. Alternately, SPS module 708 may be configured to determine that the number of SPS occasions to be cancelled is less than a number of SPS occasions to be used for transmission, and set the occasion-identification mode to indicate that the occasion-identification parameters identify SPS occasions to be cancelled. For example, during period of heavy traffic, the BS 700 is likely to schedule DL transmissions on more SPS occasions than it will leave empty. Accordingly, the SPS module 708 may be configured to set the occasion-identification mode to identify empty SPS occasions, since they will be less numerous than non-empty SPS occasions. Conversely, during periods of light traffic, the BS 700 is likely to leave more SPS occasions empty than it those it will use to transmit DL data on. Accordingly, the SPS module 708 may be configured to set the occasion-identification mode to identify non-empty SPS occasions, since they will be less numerous.

SPS module 708 may further be configured to transmit to the UE (e.g., via DCI), one or more occasion-identification parameters. In some aspects, the occasion-identification parameters may include a configuration including a set of one or more bitmaps (transmitted, e.g., via RRC or MAC-CE), where each bit of a bitmap in the set indicates whether an SPS occasion corresponding to the bit is to be cancelled or to be used for transmission based on the occasion-identification mode. If the occasion-identification mode is set to identify empty occasions, a 1 in the bitmap may indicate an empty occasion, and a 0 in the bitmap may indicate a non-empty occasion. Alternately, if the occasion-identification mode is set to identify non-empty occasions, a 1 in the bitmap may indicate a non-empty occasion, and a 0 in the bitmap would may indicate an empty occasion. In some aspects, the meaning of 0 and 1 may be reversed.

The bitmap may be applicable to a window of SPS occasions (referred to as a cancellation window if the bits indicate empty occasions, or an activation window if the bits indicate non-empty occasions) with the length of the bitmap corresponding to the length of the window. For example, with the occasion-identification mode set to identify empty occasions and a cancellation window of size 4, the bitmap "0100" would indicate that the first occasion is non-empty, the second occasion is empty, and the third and fourth occasions are non-empty. The set of bitmaps may be generated based on a traffic pattern. For example, for a traffic pattern where the BS will perform DL transmissions on more occasions than it cancels (e.g., where a large amount of data is to be transmitted), the generated bitmaps may include more 0s than 1s (if 1 indicates a cancelled occasion). Conversely, for a traffic pattern where the BS will cancel more occasions than those it will perform DL transmissions on (e.g., where a small amount of data is to be transmitted), the generated bitmaps may include more 1s than 0s (if 1 indicates a cancelled occasion).

In some aspects the SPS module 708 may be further configured to transmit, to the UE 115, a bitmap index (e.g., via DCI) indicating a first bitmap of the set of one or more bitmaps. The bitmap index may indicate which bitmap of the set to apply to a window following the transmission of the index. SPS module 708 may select the first bitmap based on a traffic pattern. For example, in low-traffic scenarios, SPS module 708 may be configured to select a bitmap from the set that indicates more cancelled occasions than it would in high-traffic scenarios. In some aspects, when the occasion-identification mode indicates the one or more occasion-identification parameters identify SPS occasions to be used for transmission, SPS module 708 may be configured to transmit data signals (e.g., via PDSCH) in SPS occasions corresponding to bits set to 1 in the bitmap (e.g., where 1 indicates a non-empty occasion). Where the occasion-identification mode indicates the occasion-identification parameters identify SPS occasions to be cancelled, SPS module 708 may refrain from transmitting a data signal in SPS occasions corresponding to bits set to 1 in the bitmap (e.g., where 1 indicates an empty occasion).

In some aspects, SPS module 708 may further be configured to transmit to the UE 115 (e.g., via RRC, MAC-CE, or DCI) an indication of a number of time periods (e.g., the number of cancellation or activation windows) to which a bitmap in the set of one or more bitmaps applies. For example, the SPS module 708 may indicate that a bitmap in the set is to be applied for up to four cancellation windows. The UE 115 may then assume it can reuse the bitmap indicated by the bitmap index up to four times if the SPS module 708 does not transmit a new bitmap index indicating otherwise.

In some aspects, SPS module 708 may be further configured to transmit an occasion marker (as part of the occasion-identification parameters) identifying whether an SPS occasion following the occasion marker is to be cancelled or used for transmission based on the occasion-identification mode. For example, if the occasion-identification mode indicates the occasion-identification parameters identify SPS occasions to be used for transmission, the next SPS occasion following the occasion marker is intended for transmission, but if the occasion-identification mode indicates the occasion-identification parameters identify SPS occasions to be cancelled, the next SPS occasion following the occasion marker will be empty. In some aspects, SPS module 708 may be further configured to transmit an indication of an offset (e.g., via RRC, MAC-CE, or DCI) associated with the occasion marker. For example, if the offset is configured to be 2, the occasion marker would mark the second SPS occasion occurring after the occasion marker as empty or non-empty (depending on the occasion-identification mode).

The SPS module 708 may be further configured to transmit the occasion marker explicitly as part of an SPS reactivation DCI message. For example, the SPS reactivation DCI message may include a field indicating the occasion marker. In some aspects, the SPS module 708 may transmit, to the UE 115, a first SPS reactivation signal including a first set of one or more configuration parameters, and transmit a second SPS reactivation signal including a second set of one or more configuration parameters with each configuration parameter of the second set having values equal to a corresponding configuration parameter in the first set, where the occasion marker comprises the second SPS reactivation signal. In other words, the SPS module 708 may transmit an SPS reactivation signal with a set of parameters unchanged from the previous SPS reactivation signal (or SPS activation signal), and the reactivation signal with the unchanged parameters itself would implicitly serve as the occasion marker.

In some aspects, SPS module 708 may be further configured to transmit an occasion index associated with a first SPS occasion as part of the occasion-identification parameters. The occasion index may be included in an activation or reactivation DCI, and/or in a special DCI for transmitting the occasion index. SPS module 708 may determine, based on a traffic pattern, whether the first SPS occasion will be cancelled or used for transmission. The SPS module 708 may transmit, to the UE 115, the occasion index based on determining the first SPS occasion will be cancelled and the occasion-identification mode indicating the one or more occasion-identification parameters identify SPS occasions to be cancelled. The SPS module 708 may then refrain from transmitting a data signal in the first SPS occasion. For example, the SPS module 708 may determine that the third SPS in a cancellation window (corresponding, for example, to occasion index 2 if using zero-based indexing) should be cancelled and transmit an occasion index with a value of 2 to the UE 115. The SPS module 708 may then refrain from transmitting in the occasion with index 2. The SPS module 708 may also transmit, to the UE, the occasion index based on determining the first SPS occasion will be used for transmission and the occasion-identification mode indicating that the one or more occasion-identification parameters identify SPS occasions to be used for transmission. The SPS module 708 may then transmit, to the UE 115, a data signal in the first SPS occasion.

In some aspects, SPS module 708 may be further configured to performs SPS transmission based on the mode indication and the one or more occasion-identification parameters. When the occasion-identification mode indicates the one or more occasion-identification parameters identify SPS occasions to be used for transmission, SPS module 708 may transmit a data signal in SPS occasions identified by the one or more occasion-identification parameters. When the occasion-identification mode indicates the one or more occasion-identification parameters identify SPS occasions to be cancelled, SPS module 708 may refrain from transmitting a data signal in SPS occasions identified by the one or more occasion-identification parameters.

As shown, the transceiver 710 may include the modem subsystem 712 and the RF unit 714. The transceiver 710 can be configured to communicate bi-directionally with other devices, such as the UEs 115 and/or 800 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., RRC configurations, SPS configurations, activations, reactivations, and releases, and PDSCH data, DCI) from the modem subsystem 712 (on outbound transmissions) or of transmissions originating from another source such as a UE 115 and/or UE 800. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 700 to enable the BS 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices and provide the received data messages for processing and/or demodulation at the transceiver 710. The transceiver 710 may provide the demodulated and decoded data (e.g., HARQ ACK/NACK, etc.) to the SPS module 708 for processing. The antennas 716 may include multiple antennas of similar or different designs in order to sustain multiple transmission links.

In an example, the transceiver 710 is configured to communicate with one or more components of the BS 700 to transmit, to a UE 115 an SPS configuration indicating a plurality of SPS occasions. The transceiver is further configured to transmit, to the UE 115, a mode indication indicating an occasion-identification mode, the occasion-identification mode indicating whether one or more occasion-identification parameters identify one or more SPS occasions of the plurality of SPS occasions to be cancelled or to be used for transmission. The transceiver is further configured to transmit, to the UE, the one or more occasion-identification parameters. The transceiver is further configured to perform SPS transmission based on the mode indication and the one or more occasion-identification parameters In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Figure 8:
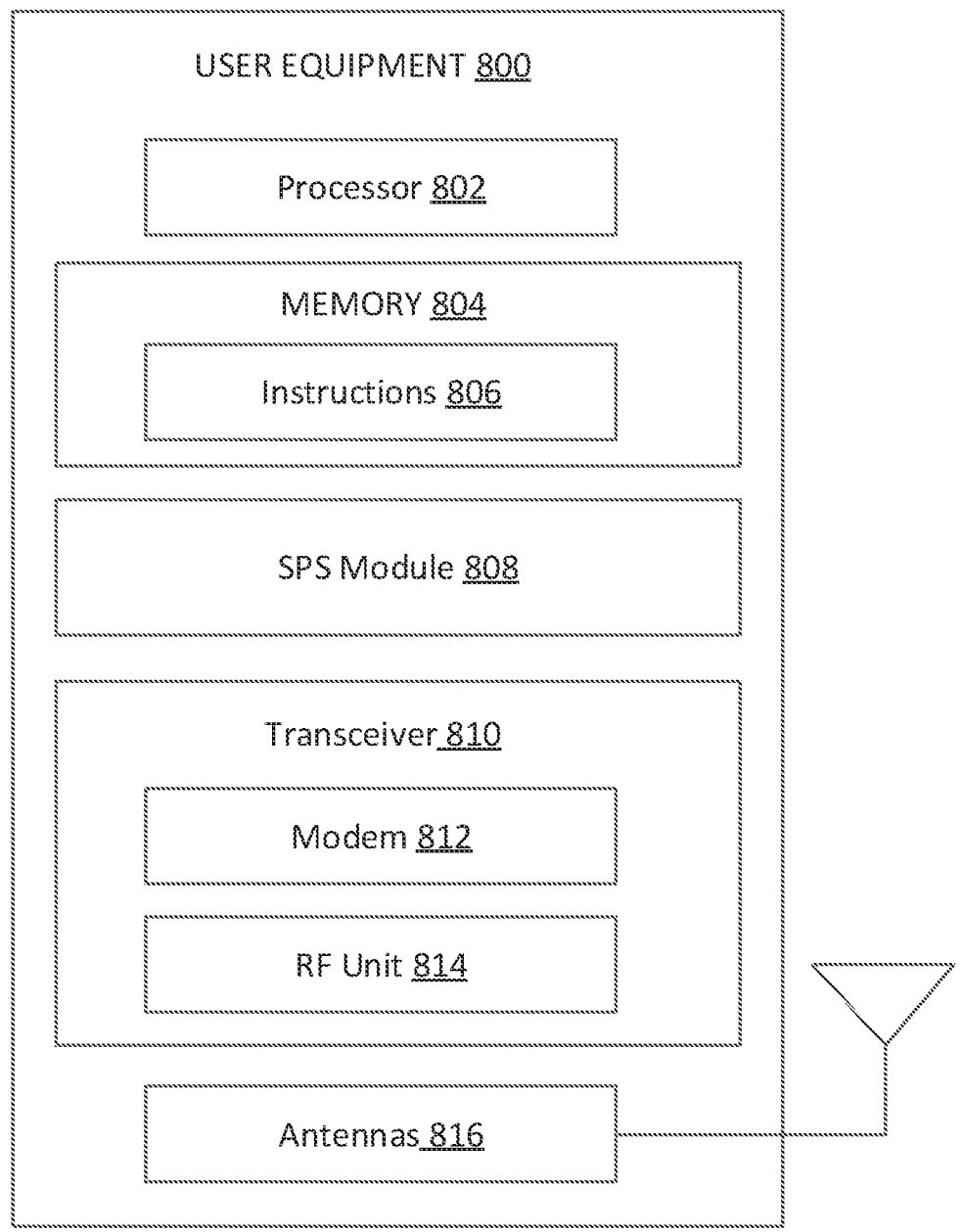
FIG. 8 illustrates a block diagram of a user equipment (UE) according to some aspects of the present disclosure.

FIG. 8 is a block diagram of an exemplary UE 800 according to some aspects of the present disclosure. The UE 800 may be a UE 115 as discussed above in FIGS. 1 and 15. As shown, the UE 800 may include a processor 802, a memory 804, an SPS module 808, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UE 115 in connection with aspects of the present disclosure, for example, aspects of FIGS. 2-6 and 10-11 Instructions 806 may also be referred to as code, which may be interpreted broadly to include any type of computer-readable statement(s) as discussed above with respect to FIG. 7.

The SPS module 808 may be implemented via hardware, software, or combinations thereof. For example, the SPS module 808 may be implemented as a processor, circuit, and/or instructions 806 stored in the memory 804 and executed by the processor 802. In some instances, the SPS module 808 can be integrated within the modem subsystem 812. For example, the SPS module 808 can be implemented by a combination of software components (e.g., executed by a DSP or a general processor) and hardware components (e.g., logic gates and circuitry) within the modem subsystem 812.

The SPS module 808 may communicate with one or more components of UE 800 to implement various aspects of the present disclosure, for example, aspects of FIGS. 2-6 and 10-11. For instance, the SPS module 808 may be configured to receive an SPS configuration indicating a plurality of SPS occasions from a BS 105. The SPS occasions may be associated with PDSCH transmissions. The SPS module 808 may receive the configuration via RRC and the configuration may include an indication of a periodicity for the SPS occasions (e.g., at what intervals the UE should monitor the PDSCH for DL transmissions). The SPS module 808 may also be configured to receive (e.g., via DCI, RRC, or MAC-CE) a mode indication indicating an occasion-identification mode. The occasion-identification mode may indicate whether one or more occasion-identification parameters identify one or more SPS occasions of the plurality of SPS occasions to be cancelled (also referred to as empty occasions) or to be used for transmission (also referred to as non-empty occasions). The SPS module 808 may also be configured to receive (e.g., via DCI), the one or more occasion-identification parameters.

In some aspects, the occasion-identification parameters may include a configuration including a set of one or more bitmaps (received, e.g., via RRC or MAC-CE), where each bit of a bitmap in the set indicates whether an SPS occasion corresponding to the bit is to be cancelled or to be used for transmission based on the occasion-identification mode. If the occasion-identification mode is set to identify empty (that is, cancelled) occasions, a 1 in the bitmap may indicate an empty occasion, and a 0 in the bitmap may indicate a non-empty occasion. Alternately, if the occasion-identification mode is set to identify non-empty occasions (occasions to be used for transmission), a 1 in the bitmap may indicate a non-empty occasion, and a 0 in the bitmap would indicate an empty occasion. In some aspects, the meaning of 0 and 1 may be reversed. The bitmap may be applicable to a window including a number of SPS occasions. The window may be referred to as a cancellation window if the bits indicate empty occasions, or an activation window if the bits indicate non-empty occasions. The length of the bitmap corresponds to the length of the window. For example, with the occasion-identification mode set to identify empty occasions and a window size (e.g., a cancellation window size) of 4, the bitmap "0100" would indicate that the first occasion is non-empty, the second occasion is empty, and the third and fourth occasions are non-empty.

The SPS module 808 may also receive a bitmap index (e.g., via DCI) indicating a first bitmap of the set of one or more bitmaps from the BS. The bitmap index may indicate which bitmap of the set to apply to a window (e.g., a cancellation or activation window) following the reception of the index. In some aspects, when the occasion-identification mode indicates the one or more occasion-identification parameters identify SPS occasions to be used for transmission, the SPS module 808 may receive a data signal (e.g., via PDSCH) in a first SPS occasion corresponding to a first bit of the first bitmap, where the first bit is set to 1 (e.g., where 1 indicates a non-empty occasion). In some aspects, where the occasion-identification mode indicates the one or more occasion-identification parameters identify SPS occasions to be cancelled, the UE may refrain from monitoring for a data signal in a first SPS occasion corresponding to a first bit of the first bitmap, where the first bit is set to 1 (e.g., where 1 indicates an empty occasion).

The SPS module 808 may further be configured to receive (e.g., via RRC or MAC-CE) an indication of a number of time periods (e.g., the number of cancellation or activation windows) to which a first bitmap in the set of one or more bitmaps applies. For example, the indication may indicate that a bitmap is to be applied for up to four cancellation windows. The SPS module 808 may then assume it can reuse the bitmap indicated by the bitmap index up to four times if it does not receive a new bitmap index indicating otherwise.

In some aspects, the occasion-identification parameters received by the SPS module 808 may include an occasion marker identifying whether a first SPS occasion of one or more SPS occasions following the occasion marker is to be cancelled or to be used for reception based on the occasion-identification mode. For example, if the occasion-identification mode indicates the one or more occasion-identification parameters identify SPS occasions to be used for reception, the next SPS occasion following the occasion marker is to be used for reception. If the occasion-identification mode indicates the one or more occasion-identification parameters identify SPS occasions to be cancelled, the next SPS occasion following the occasion marker will be empty. In other words, the SPS module 808 may refrain from monitoring for a data signal in the first SPS occasion. In some aspects, the SPS module 808 may receive from the BS an indication of an offset associated with the occasion marker, with the first SPS occasion being offset relative to the occasion marker based on the offset. For example, if the offset is configured to be 2, the occasion marker would apply to the second SPS occasion occurring after the occasion marker.

In some aspects, SPS module 808 may receive the occasion marker explicitly as part of an SPS reactivation DCI message. For example, the SPS reactivation DCI message may include a field indicating the occasion marker. In some aspects, SPS module 808 may receive a first SPS reactivation signal including a first set of one or more configuration parameters from the BS, then receive a second SPS reactivation signal including a second set of one or more configuration parameters with each configuration parameter of the second set having values equal to a corresponding configuration parameter in the first set. The second SPS reactivation signal would then comprise the occasion marker. In other words, SPS module 808 may receive an SPS reactivation signal with a set of parameters unchanged from the previous SPS reactivation signal (or SPS activation signal), and the reactivation signal with the unchanged parameters itself would implicitly serve as the occasion marker.

In some aspects, the occasion-identification parameters received by the SPS module 808 may include an occasion index associated with a first SPS occasion. The occasion index may be included in an activation or reactivation DCI, and/or in a special DCI for transmitting the occasion index, and may indicate whether the first SPS occasion is to be used for reception, or whether it is cancelled. If the occasion-identification mode indicates the one or more occasion-identification parameters identify SPS occasions to be cancelled, SPS module 808 may refrain from monitoring the first SPS occasion (i.e., the SPS occasion identified by the index). If the occasion-identification mode indicates the one or more occasion-identification parameters identify SPS occasions to be used for reception, SPS module 808 may receive a data signal from the BS in the first occasion.

SPS module 808 may be further configured to perform SPS reception based on the mode indication and the one or more occasion-identification parameters When the occasion-identification mode indicates the one or more occasion-identification parameters identify SPS occasions to be used for transmission, performing the SPS reception may include receiving a data signal in SPS occasions identified by the one or more occasion-identification parameters. When the occasion-identification mode indicates the one or more occasion-identification parameters identify SPS occasions to be cancelled, performing the SPS reception may include refraining from monitoring for a data signal in SPS occasions identified by the one or more occasion-identification parameters.

As shown, the transceiver 810 may include the modem subsystem 812 and the RF unit 814. The transceiver 810 can be configured to communicate bi-directionally with other devices, such as the BSs 105 and 700. The modem subsystem 812 may be configured to modulate and/or encode the data from the memory 804 and/or the SPS module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., HARQ ACK/NACK) from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., RRC configurations and SPS configurations, activations, reactivations, and releases, PDSCH data, DCI) to the SPS module 808 for processing. The antennas 816 may include multiple antennas of similar or different designs in order to sustain multiple transmission links.

In an example, the transceiver 810 is configured to communicate with one or more components of the UE 800 to receive receiving, from a base station, an SPS configuration indicating a plurality of SPS occasions. The transceiver 810 is further configured to receive, from the BS 105, a mode indication indicating an occasion-identification mode, the occasion-identification mode indicating whether one or more occasion-identification parameters identify SPS occasions to be cancelled or SPS occasions to be used for reception of the plurality of SPS occasions. The transceiver 810 is further configured to receive, from the BS 105, the one or more occasion-identification parameters, and perform SPS reception based on the mode indication and the one or more occasion-identification parameters.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
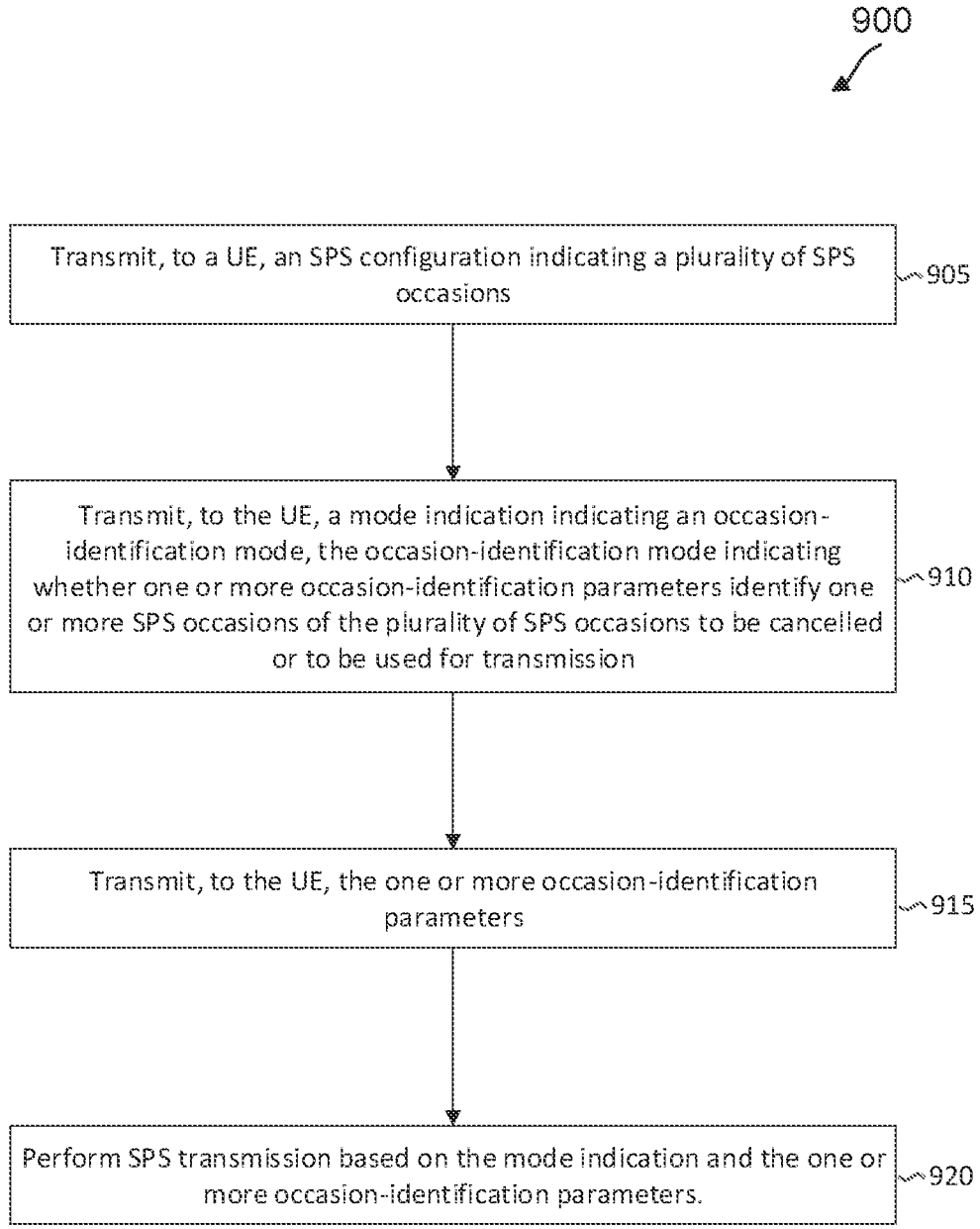
FIG. 9 is a flow diagram of a communication method according to some aspects of the present disclosure.

FIG. 9 is a flow diagram illustrating a communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as a BS 105 or the BS 700, may utilize one or more components, such as the processor 702, the memory 704, the SPS module 708, the transceiver 710, the modem 712, and the one or more antennas 716, to execute the steps of method 900. The method 900 may employ similar mechanisms as described in FIGS. 2-7 and 11. As illustrated, the method 900 includes a number of enumerated steps, but aspects of the method 900 may include additional steps before, after, and in between the enumerated steps. In some aspects, one or more of the enumerated steps may be omitted or performed in a different order.

At block 905, the BS 105 transmits, to a UE 115, an SPS configuration indicating a plurality of SPS occasions. The SPS occasions may be associated with PDSCH transmissions. The SPS configuration may be transmitted via RRC and include an indication of a periodicity for the SPS occasions (e.g., at what intervals the UE should monitor the PDSCH for DL transmissions). In some aspects, the BS 105 may utilize one or more components, such as the processor 702, the memory 704, the SPS module 708, the transceiver 710, the modem 712, and the one or more antennas 716, to perform the operations at block 905.

At block 910, the BS 105 transmits, to the UE 115, a mode indication indicating an occasion-identification mode. The occasion-identification mode indicates whether one or more occasion-identification parameters identify one or more SPS occasions of the plurality of SPS occasions to be cancelled (also referred to as empty occasions) or to be used for transmission (also referred to as non-empty occasions). The BS 105 may determine that the number of SPS occasions to be cancelled is greater than a number of SPS occasions to be used for transmission and determine that the occasion-identification mode indicates that the one or more occasion-identification parameters identify SPS occasions to be used for transmission. Alternately, the BS 105 may determine that the number of SPS occasions to be cancelled is less than a number of SPS occasions to be used for transmission, and determine that the occasion-identification mode indicates that the one or more occasion-identification parameters identify SPS occasions to be cancelled.

For example, during period of heavy traffic, the BS 105 is likely to schedule DL transmissions on more SPS occasions than it will leave empty. In this situation, the BS 105 may set the occasion-identification mode to identify empty SPS occasions, since they will be less numerous than non-empty SPS occasions. Conversely, during periods of light traffic, the BS 105 is likely to leave more SPS occasions empty than it those it will use to transmit DL data on. In this situation, the BS 105 may set the occasion-identification mode to identify non-empty SPS occasions, since they will be less numerous. By setting the occasion-identification mode to identify the less-frequently occurring type of occasion (empty or non-empty), the BS 105 may use fewer resources when indicating to the UE 115 whether an SPS occasion is cancelled or will be used for transmission. For example, if the mode is set to identify empty SPS occasions, the UE 115 may assume any occasion not identified by the BS 105 according to the various aspects described herein is non-empty, and vice-versa.

The mode indication may be transmitted by the BS 105 using DCI, RRC, or MAC-CE. In some aspects, the BS 105 may utilize one or more components, such as the processor 702, the memory 704, the SPS module 708, the transceiver 710, the modem 712, and the one or more antennas 716, to perform the operations at block 910.

At block 915, the BS 105 transmits to the UE 115 (e.g., via DCI), one or more occasion-identification parameters. In some aspects, the occasion-identification parameters may include a configuration including a set of one or more bitmaps (transmitted, e.g., via RRC or MAC-CE), where each bit of a bitmap in the set indicates whether an SPS occasion corresponding to the bit is to be cancelled or to be used for transmission based on the occasion-identification mode. If the occasion-identification mode is set to identify empty (that is, cancelled) occasions, a 1 in the bitmap may indicate an empty occasion, and a 0 in the bitmap may indicate a non-empty occasion. Alternately, if the occasion-identification mode is set to identify non-empty occasions (occasions to be used for transmission), a 1 in the bitmap may indicate a non-empty occasion, and a 0 in the bitmap would indicate an empty occasion. In some aspects, the meaning of 0 and 1 may be reversed. The bitmap may be applicable to a window including a number of SPS occasions. The window may be referred to as a cancellation window if the bits indicate empty occasions, or an activation window if the bits indicate non-empty occasions. The length of the bitmap corresponds to the length of the window. For example, with the occasion-identification mode set to identify empty occasions and a window size (e.g., a cancellation window size) of 4, the bitmap "0100" would indicate that the first occasion is non-empty, the second occasion is empty, and the third and fourth occasions are non-empty. The set of bitmaps may be generated based on a traffic pattern. For example, for a traffic pattern where the BS 105 will perform DL transmissions on more occasions than it cancels (e.g., where a large amount of data is to be transmitted), the generated bitmaps may include more 0s than 1s (if 1 indicates a cancelled occasion). Conversely, for a traffic pattern where the BS 105 will cancel more occasions than those it will perform DL transmissions on (e.g., where a small amount of data is to be transmitted), the generated bitmaps may include more 1s than 0s (if 1 indicates a cancelled occasion).

In some aspects the BS 105 may transmit, to the UE 115, a bitmap index (e.g., via DCI) indicating a first bitmap of the set of one or more bitmaps. The bitmap index may indicate which bitmap of the set to apply to a window (e.g., a cancellation or activation window) following the transmission of the index. For a set of bitmaps containing M bitmaps, the BS 105 may indicate the bitmap index using log 2(M) bits. For example, for a set of bitmaps containing 4 bitmaps, the BS 105 may indicate the bitmap index using 2 bits. In some aspects, the BS 105 may select the first bitmap based on a traffic pattern. For example, in low-traffic scenarios, the BS 105 may select a bitmap from the set that indicates more cancelled occasions than it would in high-traffic scenarios. In some aspects, when the occasion-identification mode indicates the one or more occasion-identification parameters identify SPS occasions to be used for transmission, the BS 105 may transmit a data signal (e.g., via PDSCH) in a first SPS occasion corresponding to a first bit of the first bitmap, wherein the first bit is set to 1 (e.g., where 1 indicates a non-empty occasion). In some aspects, where the occasion-identification mode indicates the one or more occasion-identification parameters identify SPS occasions to be cancelled, the BS 105 may refrain from transmitting a data signal in a first SPS occasion corresponding to a first bit of the first bitmap, wherein the first bit is set to 1 (e.g., where 1 indicates an empty occasion).

In some aspects, the BS 105 may transmit to the UE 115 (e.g., via RRC or MAC-CE) an indication of a number of time periods (e.g., the number of cancellation or activation windows) to which a first bitmap in the set of one or more bitmaps applies. For example, the BS 105 may indicate that a bitmap is to be applied for up to four cancellation windows. The UE 115 may then assume it can reuse the bitmap indicated by the bitmap index up to four times if the BS 105 does not transmit a new bitmap index indicating otherwise.

In some aspects, the occasion-identification parameters transmitted by the BS 105 may include an occasion marker identifying whether a first SPS occasion of one or more SPS occasions following the occasion marker is to be cancelled or to be used for transmission based on the occasion-identification mode. For example, if the occasion-identification mode indicates the one or more occasion-identification parameters identify SPS occasions to be used for transmission, the next SPS occasion following the occasion marker is intended for transmission, but if the occasion-identification mode indicates the one or more occasion-identification parameters identify SPS occasions to be cancelled, the next SPS occasion following the occasion marker will be empty. In other words, the BS 105 may refrain from transmitting a data signal in the first SPS occasion. In some aspects, the BS 105 may transmit an indication of an offset associated with the occasion marker, wherein the first SPS occasion is offset relative to the occasion marker based on the offset associated with the occasion marker. For example, if the offset is configured to be 2 occasions, the transmission of the occasion marker would apply to the second SPS occasion occurring after the occasion marker.

In some aspects, the occasion marker may be transmitted explicitly as part of an SPS reactivation DCI message. For example, the SPS reactivation DCI message may include a field indicating the occasion marker. In some aspects, the BS 105 may transmit, to the UE 115, a first SPS reactivation signal including a first set of one or more configuration parameters, and transmit a second SPS reactivation signal including a second set of one or more configuration parameters with each configuration parameter of the second set having values equal to a corresponding configuration parameter in the first set, where the occasion marker comprises the second SPS reactivation signal. In other words, the BS 105 may transmit a SPS reactivation signal with a set of parameters unchanged from the previous SPS reactivation signal (or SPS activation signal), and the reactivation signal with the unchanged parameters itself would implicitly serve as the occasion marker.

In some aspects, the occasion-identification parameters transmitted by the BS 105 may include an occasion index associated with a first SPS occasion. The occasion index may be included in an activation or reactivation DCI, and/or in a special DCI for transmitting the occasion index. The BS 105 may determine, based on a traffic pattern, whether the first SPS occasion will be cancelled or used for transmission. The BS 105 may transmit, to the UE 115, the occasion index based on determining the first SPS occasion will be cancelled and the occasion-identification mode indicating the one or more occasion-identification parameters identify SPS occasions to be cancelled. The BS 105 may then refrain from transmitting a data signal in the first SPS occasion. For example, the BS 105 may determine that the third SPS in a cancellation window (corresponding, for example, to occasion index 2 if using zero-based indexing) should be cancelled and transmit an occasion index with a value of 2 to the UE 115. The BS 105 may then refrain from transmitting in occasion index 2. The BS 105 may also transmit, to the UE 115, the occasion index based on determining the first SPS occasion will be used for transmission and the occasion-identification mode indicating that the one or more occasion-identification parameters identify SPS occasions to be used for transmission. The BS 105 may then transmit, to the UE 115, a data signal in the first SPS occasion.

In some aspects, the BS 105 may utilize one or more components, such as the processor 702, the memory 704, the SPS module 708, the transceiver 710, the modem 712, and the one or more antennas 716, to perform the operations at block 915.

At block 920, the BS 105 performs SPS transmission based on the mode indication and the one or more occasion-identification parameters. When the occasion-identification mode indicates the one or more occasion-identification parameters identify SPS occasions to be used for transmission, performing the SPS transmission may include transmitting a data signal in SPS occasions identified by the one or more occasion-identification parameters. When the occasion-identification mode indicates the one or more occasion-identification parameters identify SPS occasions to be cancelled, performing the SPS transmission may include refraining from transmitting a data signal in SPS occasions identified by the one or more occasion-identification parameters. In some aspects, the BS 105 may utilize one or more components, such as the processor 702, the memory 704, the SPS module 708, the transceiver 710, the modem 712, and the one or more antennas 716, to perform the operations at block 915.

Figure 10:
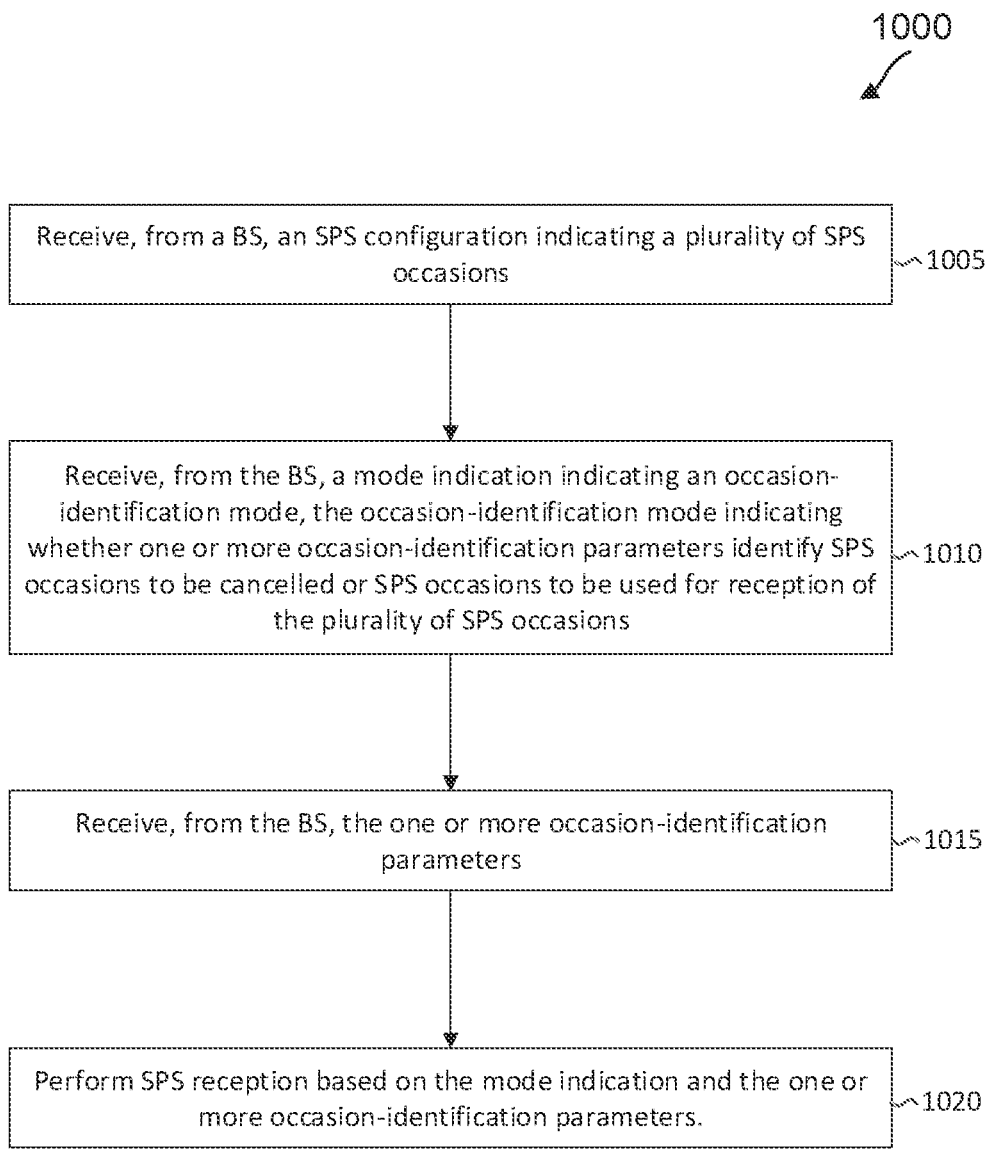
FIG. 10 is a flow diagram of a communication method according to some aspects of the present disclosure.

FIG. 10 is a flow diagram illustrating a communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as a UE 115 or the UE 800, may utilize one or more components, such as the processor 802, the memory 804, the SPS module 808, the transceiver 810, the modem 812, and the one or more antennas 816, to execute the steps of method 1000. The method 1000 may employ similar mechanisms as described in FIGS. 1-6, 8, and 11. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1005, the UE 115 receives, from a BS 105, an SPS configuration indicating a plurality of SPS occasions. The SPS occasions may be associated with PDSCH transmissions. The SPS configuration may be received via RRC and include an indication of a periodicity for the SPS occasions (e.g., at what intervals the UE 115 should monitor the PDSCH for DL transmissions). In some aspects, the UE 115 may utilize one or more components, such as the processor 802, the memory 804, the SPS module 808, the transceiver 810, the modem 812, and the one or more antennas 816, to perform the operations at block 1005.

At block 1010, the UE 115 receives, a mode indication indicating an occasion-identification mode. The occasion-identification mode indicates whether one or more occasion-identification parameters identify one or more SPS occasions of the plurality of SPS occasions to be cancelled (also referred to as empty occasions) or to be used for transmission (also referred to as non-empty occasions). The mode indication may be received by the UE 115 using DCI, RRC, or MAC-CE. In some aspects, the UE 115 may utilize one or more components, such as the processor 802, the memory 804, the SPS module 808, the transceiver 810, the modem 812, and the one or more antennas 816, to perform the operations at block 1010.

At block 1015, the UE 115 receives (e.g., via DCI), the one or more occasion-identification parameters. In some aspects, the occasion-identification parameters may include a configuration including a set of one or more bitmaps (received, e.g., via RRC or MAC-CE), where each bit of a bitmap in the set indicates whether an SPS occasion corresponding to the bit is to be cancelled or to be used for transmission based on the occasion-identification mode. If the occasion-identification mode is set to identify empty (that is, cancelled) occasions, a 1 in the bitmap may indicate an empty occasion, and a 0 in the bitmap may indicate a non-empty occasion. Alternately, if the occasion-identification mode is set to identify non-empty occasions (occasions to be used for transmission), a 1 in the bitmap may indicate a non-empty occasion, and a 0 in the bitmap would indicate an empty occasion. In some aspects, the meaning of 0 and 1 may be reversed. The bitmap may be applicable to a window including a number of SPS occasions. The window may be referred to as a cancellation window if the bits indicate empty occasions, or an activation window if the bits indicate non-empty occasions. The length of the bitmap corresponds to the length of the window. For example, with the occasion-identification mode set to identify empty occasions and a window size (e.g., a cancellation window size) of 4, the bitmap "0100" would indicate that the first occasion is non-empty, the second occasion is empty, and the third and fourth occasions are non-empty.

In some aspects the UE 115 may receive, from the BS 105, a bitmap index (e.g., via DCI) indicating a first bitmap of the set of one or more bitmaps. The bitmap index may indicate which bitmap of the set to apply to a window (e.g., a cancellation or activation window) following the reception of the index. In some aspects, when the occasion-identification mode indicates the one or more occasion-identification parameters identify SPS occasions to be used for transmission, the UE 115 may receive a data signal (e.g., via PDSCH) in a first SPS occasion corresponding to a first bit of the first bitmap, wherein the first bit is set to 1 (e.g., where 1 indicates a non-empty occasion). In some aspects, where the occasion-identification mode indicates the one or more occasion-identification parameters identify SPS occasions to be cancelled, the UE 115 may refrain from monitoring for a data signal in a first SPS occasion corresponding to a first bit of the first bitmap, wherein the first bit is set to 1 (e.g., where 1 indicates an empty occasion).

In some aspects, the UE 115 may receive (e.g., via RRC or MAC-CE), from the BS 105, an indication of a number of time periods (e.g., the number of cancellation or activation windows) to which a first bitmap in the set of one or more bitmaps applies. For example, the indication may indicate that a bitmap is to be applied for up to four cancellation windows. The UE 115 may then assume it can reuse the bitmap indicated by the bitmap index up to four times if it does not receive a new bitmap index indicating otherwise.

In some aspects, the occasion-identification parameters received by the UE 115 may include an occasion marker identifying whether a first SPS occasion of one or more SPS occasions following the occasion marker is to be cancelled or to be used for reception based on the occasion-identification mode. For example, if the occasion-identification mode indicates the one or more occasion-identification parameters identify SPS occasions to be used for reception, the next SPS occasion following the occasion marker is to be used for reception, but if the occasion-identification mode indicates the one or more occasion-identification parameters identify SPS occasions to be cancelled, the next SPS occasion following the occasion marker will be empty. In other words, the UE 115 may refrain from monitoring for a data signal in the first SPS occasion. In some aspects, the UE 115 may receive from the BS 105 an indication of an offset associated with the occasion marker, wherein the first SPS occasion is offset relative to the occasion marker based on the offset associated with the occasion marker. For example, if the offset is configured to be 2 occasions, the occasion marker would apply to the second SPS occasion occurring after the occasion marker.

In some aspects, the occasion marker may be received explicitly as part of an SPS reactivation DCI message. For example, the SPS reactivation DCI message may include a field indicating the occasion marker. In some aspects, the UE 115 may receive from the BS 105 a first SPS reactivation signal including a first set of one or more configuration parameters, and receive a second SPS reactivation signal including a second set of one or more configuration parameters with each configuration parameter of the second set having values equal to a corresponding configuration parameter in the first set, where the occasion marker comprises the second SPS reactivation signal. In other words, the UE 115 may receive an SPS reactivation signal with a set of parameters unchanged from the previous SPS reactivation signal (or SPS activation signal), and the reactivation signal with the unchanged parameters itself would implicitly serve as the occasion marker.

In some aspects, the occasion-identification parameters received by the UE 115 may include an occasion index associated with a first SPS occasion. The occasion index may be included in an activation or reactivation DCI, and/or in a special DCI for transmitting the occasion index, and may indicate whether the first SPS occasion is to be used for reception, or whether it is cancelled. If the occasion-identification mode indicates the one or more occasion-identification parameters identify SPS occasions to be cancelled, the UE 115 may refrain from monitoring the first SPS occasion (i.e., the SPS occasion identified by the index). If the occasion-identification mode indicates the one or more occasion-identification parameters identify SPS occasions to be used for reception, the UE 115 may receive a data signal from the BS 105 in the first occasion. In some aspects, the UE 115 may utilize one or more components, such as the processor 802, the memory 804, the SPS module 808, the transceiver 810, the modem 812, and the one or more antennas 816, to perform the operations at block 1015.

At block 1020, the UE 115 performs SPS reception based on the mode indication and the one or more occasion-identification parameters When the occasion-identification mode indicates the one or more occasion-identification parameters identify SPS occasions to be used for transmission, performing the SPS reception may include receiving a data signal in SPS occasions identified by the one or more occasion-identification parameters. When the occasion-identification mode indicates the one or more occasion-identification parameters identify SPS occasions to be cancelled, performing the SPS reception may include refraining from monitoring for a data signal in SPS occasions identified by the one or more occasion-identification parameters. In some aspects, the UE 115 may utilize one or more components, such as the processor 802, the memory 804, the SPS module 808, the transceiver 810, the modem 812, and the one or more antennas 816, to perform the operations at block 1020.

Figure 11:
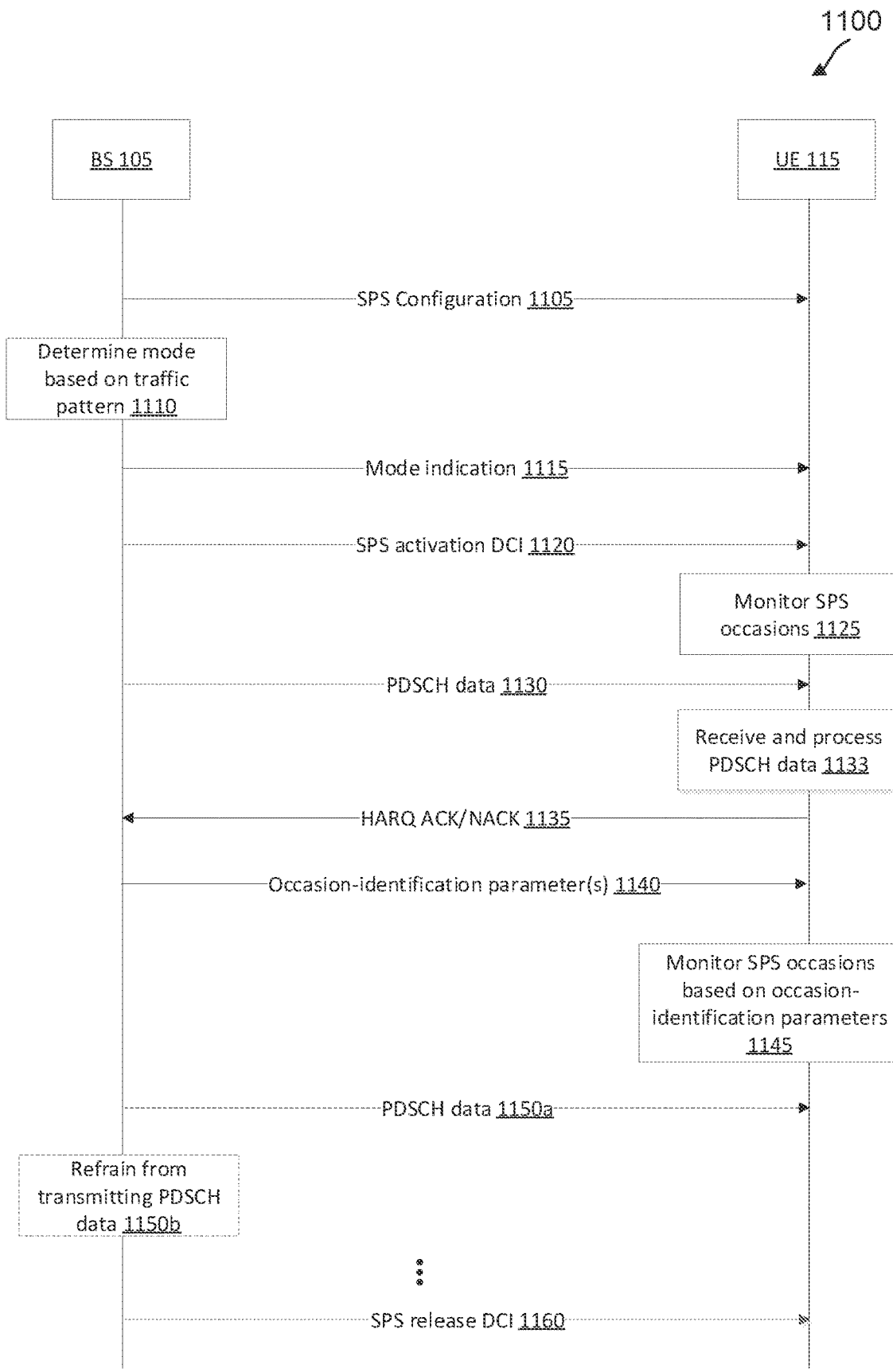
FIG. 11 is a sequence diagram illustrating a communication method according to some aspects of the present disclosure.

FIG. 11 is a sequence diagram illustrating a communication method 1100 according to some aspects of the present disclosure. The method 1100 may employ similar mechanisms as discussed above in relation to FIGS. 2-10. In some aspects, the BS 105 may utilize one or more components, such as the processor 702, the memory 704, the SPS module 708, the transceiver 710, the modem 712, and the one or more antennas 716 of FIG. 7, to execute the steps of method 1100. In some aspects, the UE 115 may utilize one or more components, such as the processor 802, the memory 804, the SPS module 808, the transceiver 810, the modem 812, and the one or more antennas 816 of FIG. 8, to execute the steps of method 1100. As illustrated, the method 1100 includes a number of enumerated actions, but aspects of the method 1100 may include additional actions before, after, and in between the enumerated actions. In some aspects, one or more of the enumerated actions may be omitted or performed in a different order.

At block 1105, BS 105 transmits an SPS configuration to UE 115 indicating a plurality of SPS PDSCH occasions. The configuration, may include, for example, a periodicity indicating the interval at which the occasions repeat.

At block 1110, the BS 105 determines an occasion identification mode based on a traffic pattern. The occasion-identification mode indicates whether one or more occasion-identification parameters identify one or more SPS occasions of the plurality of SPS occasions to be cancelled (also referred to as empty occasions) or to be used for transmission (also referred to as non-empty occasions). For example, the BS 105 may determine to identify empty occasions if there will be fewer empty occasions than non-empty occasions and vice versa, as described in detail with respect to FIG. 9 above.

At block 1115, the BS 105 transmits the mode indication to the UE 115. The BS 105 may transmit the mode indication via DCI (e.g., as part of the DCI message transmitted at block 1120, or a different DCI message), RRC, or MAC-CE.

At block 1120, the BS 105 transmits an SPS activation DCI 1120, prompting the UE 115 to being monitoring the SPS PDSCH occasions indicated in the SPS configuration.

At block 1125, the UE 115 monitors the SPS PDSCH occasions indicated in the SPS configuration for PDSCH data transmissions.

At block 1130, the BS 105 may transmit PDSCH data using one of the SPS PDSCH occasions being monitored by UE 115.

At block 1133, the UE 115 may receive and process (e.g., decode) the PDSCH data transmitted by the BS 105.

At block 1135, the UE 115 may transmit HARQ data (e.g., an ACK or NACK) to the BS 105 indicating whether the UE 115 was able to successfully decode the transmitted PDSCH data. Blocks 1130, 1133, and 1135 may repeat any number of times as the BS 105 transmits data to the UE 115 at different SPS occasions indicated by the SPS configuration.

At block 1140, the BS 105 may transmit one or more occasion identification parameters to the UE 115 identifying one or more SPS occasions as being cancelled or to be used for transmission, depending on the mode indicated at block 1115. The occasion-identification parameters may include bitmaps, bitmap tables, bitmap indices, occasion markers, and/or SPS occasion indices as described in detail with respect to FIGS. 3-10.

At block 1145, the UE 115 monitors SPS occasions based on the occasion-identification parameter(s). The UE 115 may refrain from monitoring SPS occasions for downlink data where the SPS occasions were indicated as being cancelled or not indicated as being used for transmission (depending on the mode) by the occasion-identification parameter(s).

At block 1150*a*, the BS may transmit PDSCH data in occasions that were not indicated as being cancelled.

At block 1150b, the BS may refrain from transmitting PDSCH data in occasions not marked as being used for transmissions. Blocks 1150a and 1150b may be repeated multiple times, with HARQ feedback optionally being transmitted by UE 115 as in block 1135 following each transmission.

At block 1160, the BS 105 transmits an SPS release DCI and the UE 115 stops monitoring the SPS occasions indicated by the SPS configuration.

Further aspects of the present disclosure include the following:

Aspect 1: A method of wireless communication performed by a base station (BS), the method comprising: transmitting, to a user equipment (UE), a semi-persistent scheduling (SPS) configuration indicating a plurality of SPS occasions transmitting, to the UE, a mode indication indicating an occasion-identification mode, the occasion-identification mode indicating whether one or more occasion-identification parameters identify one or more SPS occasions of the plurality of SPS occasions to be cancelled or to be used for transmission; transmitting, to the UE, the one or more occasion-identification parameters; and performing SPS transmission based on the mode indication and the one or more occasion-identification parameter.

Aspect 2: The method of Aspect 1, wherein the plurality of SPS occasions are associated with physical downlink shared channel (PDSCH) transmissions.

Aspect 3: The method of Aspect 1 or 2, further comprising: determining the occasion-identification mode based on a traffic pattern.

Aspect 4: The method of Aspects 1 through 3, wherein the transmitting the one or more occasion-identification parameters comprises: transmitting, to the UE, a downlink control information (DCI) message comprising at least one of the one or more occasion-identification parameters.

Aspect 5: The method of Aspects 1 through 4, wherein the transmitting the one or more occasion-identification parameters comprises: transmitting, to the UE, a configuration including a set of one or more bitmaps, wherein each bit of a bitmap in the set of one more bitmaps indicates whether an SPS occasion corresponding to the bit is to be cancelled or to be used for transmission based on the occasion-identification mode.

Aspect 6: The method of Aspects 1 through 5, wherein the one or more occasion-identification parameters includes an occasion marker, and wherein the transmitting the one or more occasion-identification parameters comprises: transmitting, to the UE, the occasion marker, wherein the occasion marker identifies whether a first SPS occasion of one or more SPS occasions following the occasion marker is to be cancelled or to be used for transmission based on the occasion-identification mode.

Aspect 7: The method of Aspects 1 through 6, wherein the one or more occasion-identification parameters includes an occasion index, and the method further comprises: determining, based on a traffic pattern, whether a first SPS occasion will be cancelled or used for transmission, wherein the occasion index is associated with the first SPS occasion.

Aspect 8: The method of Aspects 1 through 7, wherein the transmitting the mode indication comprises: transmitting, to the UE, a downlink control information (DCI) message comprising the mode indication.

Aspect 9: The method of Aspects 1 through 8, wherein the transmitting the mode indication comprises: transmitting, to the UE, a radio resource control (RRC) message comprising the mode indication.

Aspect 10: The method of Aspects 1 through 9, wherein the transmitting the mode indication comprises: transmitting, to the UE, a medium access control control element (MAC-CE) comprising the mode indication.

Aspect 11: The method of Aspects 1 through 10, wherein the determining the occasion-identification mode comprises: determining a number of SPS occasions to be cancelled is greater than a number of SPS occasions to be used for transmission; and determining, based on the determining the number of SPS occasions to be cancelled is greater than the number of SPS occasions to be used for transmission, that the occasion-identification mode indicates the one or more occasion-identification parameters identify SPS occasions to be used for transmission.

Aspect 12: The method of Aspects 1 through 11, wherein the determining the occasion-identification mode comprises: determining a number of SPS occasions to be cancelled is less than a number of SPS occasions to be used for transmission; and determining, based on the determining the number of SPS occasions to be cancelled is less than the number of SPS occasions to be used for transmission, that the occasion-identification mode indicates the one or more occasion-identification parameters identify SPS occasions to be cancelled.

Aspect 13: The method of Aspects 1 through 12, further comprising: generating, based on a traffic pattern, the set of one or more bitmaps.

Aspect 14: The method of Aspects 1 through 13, wherein the transmitting the one or more occasion-identification parameters comprises: transmitting, to the UE, a bitmap index indicating a first bitmap of the set of one or more bitmaps.

Aspect 15: The method of Aspects 1 through 14, further comprising:
transmitting, to the UE, an indication of a number of time periods to which a first bitmap in the set of one or more bitmaps applies.

Aspect 16: The method of Aspects 1 through 15, further comprising: selecting, based on a traffic pattern, the first bitmap from the set of one or more bitmaps.

Aspect 17: The method of Aspects 1 through 16, wherein the occasion-identification mode indicates the one or more occasion-identification parameters identify SPS occasions to be used for transmission, and wherein the performing SPS transmission comprises: transmitting, to the UE, a data signal in a first SPS occasion corresponding to a first bit of the first bitmap, wherein the first bit is set to 1.

Aspect 18: The method of Aspects 1 through 17, wherein the occasion-identification mode indicates the one or more occasion-identification parameters identify SPS occasions to be cancelled, and wherein the performing the SPS transmission comprises: refraining from transmitting a data signal in a first SPS occasion corresponding to a first bit of the first bitmap, wherein the first bit is set to 1.

Aspect 19: The method of Aspects 1 through 18, further comprising: transmitting, to the UE, an indication of an offset associated with the occasion marker, wherein the first SPS occasion is offset relative to the occasion marker based on the offset associated with the occasion marker.

Aspect 20: The method of Aspects 1 through 19, further comprising: transmitting, to the UE, a first SPS reactivation signal including a first set of one or more configuration parameters; transmitting, to the UE, a second SPS reactivation signal including a second set of one or more configuration parameters with each configuration parameter of the second set having values equal to a corresponding configuration parameter in the first set, wherein the occasion marker comprises the second SPS reactivation signal.

Aspect 21: The method of Aspects 1 through 20, wherein the occasion-identification mode indicates the one or more occasion-identification parameters identify SPS occasions to be used for transmission, and wherein the performing the SPS transmission comprises: transmitting, to the UE, a data signal in the first SPS occasion.

Aspect 22: The method of Aspects 1 through 21, wherein the occasion-identification mode indicates the one or more occasion-identification parameters identify SPS occasions to be cancelled, and wherein the performing the SPS transmission comprises: refraining from transmitting a data signal in first SPS occasion.

Aspect 23: The method of Aspects 1 through 22, wherein the occasion marker is transmitted as part of an SPS reactivation downlink control information (DCI) message.

Aspect 24: The method of Aspects 1 through 23, wherein the transmitting the one or more occasion-identification parameters comprises: transmitting, to the UE, the occasion index based on determining the first SPS occasion will be cancelled and the occasion-identification mode indicating the one or more occasion-identification parameters identify SPS occasions to be cancelled, and wherein the performing the SPS transmission comprises: refraining from transmitting a data signal in the first SPS occasion.

Aspect 25: The method of Aspects 1 through 24, wherein the transmitting the one or more occasion-identification parameters comprises: transmitting, to the UE, the occasion index based on determining the first SPS occasion will be used for transmission and the occasion-identification mode indicating that the one or more occasion-identification parameters identify SPS occasions to be used for transmission, and wherein the performing the SPS transmission comprises: transmitting, to the UE, a data signal in the first SPS occasion.

Aspect 26: A method of wireless communication performed by user equipment (UE), the method comprising: receiving, from a base station (BS), a semi-persistent scheduling (SPS) configuration indicating a plurality of SPS occasions; receiving, from the BS, a mode indication indicating an occasion-identification mode, the occasion-identification mode indicating whether one or more occasion-identification parameters identify SPS occasions to be cancelled or SPS occasions to be used for reception of the plurality of SPS occasions; receiving, from the BS, the one or more occasion-identification parameters; and performing SPS reception based on the mode indication and the one or more occasion-identification parameters.

Aspect 27: The method of Aspect 26, wherein the plurality of SPS occasions are associated with physical downlink shared channel (PDSCH) transmissions.

Aspect 28: The method of Aspect 26 or 27, wherein the receiving the one or more occasion-identification parameters comprises: receiving, from the BS, a downlink control information (DCI) message comprising at least one of the one or more occasion-identification parameters.

Aspect 29: The method of Aspect 26 through 28, wherein the receiving the one or more occasion-identification parameters comprises: receiving, from the BS, a configuration including a set of one or more bitmaps, wherein a length of each bitmap in the set is associated with a time period, and each bit of a bitmap in the set of one more bitmaps indicates whether an SPS occasion corresponding to the bit is to be cancelled or to be used for reception based on the occasion-identification mode.

Aspect 30: The method of Aspects 26 through 29, wherein the one or more occasion-identification parameters includes an occasion marker, and wherein the receiving the one or more occasion-identification parameters comprises: receiving, from the BS, the occasion marker, wherein the occasion marker identifies whether a first SPS occasion of one or more SPS occasions following the occasion marker is to be cancelled or to be used for reception based on the occasion-identification mode.

Aspect 31: The method of Aspects 26 through 30, wherein the occasion-identification mode indicates that the one or more occasion-identification parameters identify SPS occasions to be cancelled, and wherein the receiving the one or more occasion-identification parameters comprises: receiving, from the BS, an occasion index associated with a first SPS occasion, and wherein the performing the SPS reception comprises: refraining from monitoring for a data signal in the first SPS occasion.

Aspect 32: The method of Aspects 26 through 31, wherein the occasion-identification mode indicates that the one or more occasion-identification parameters identify SPS occasions to be used for reception, and wherein the receiving the one or more occasion-identification parameters comprise: receiving, from the BS, an occasion index associated with a first SPS occasion, and wherein the performing the SPS reception comprises: receiving, from the BS, a data signal in the first SPS occasion.

Aspect 33: The method of Aspects 26 through 32, wherein the receiving the mode indication comprises: receiving, from the BS, a downlink control information (DCI) message comprising the mode indication.

Aspect 34: The method of Aspects 26 through 33, wherein the receiving the mode indication comprises: receiving, from the BS, a radio resource control (RRC) message comprising the mode indication.

Aspect 35: The method of Aspects 26 through 34, wherein the receiving the mode indication comprises: receiving, from the BS, a medium access control control element (MAC-CE) comprising the mode indication.

Aspect 36: The method of Aspects 26 through 35, wherein the receiving the one or more occasion-identification parameters comprises: receiving, from the BS, a bitmap index indicating a first bitmap of the set of one or more bitmaps.

Aspect 37: The method of Aspects 26 through 36, further comprising: receiving, from the BS, an indication of a number of time periods to which a first bitmap in the set of one or more bitmaps applies.

Aspect 38: The method of Aspects 26 through 37, wherein the occasion-identification mode indicates the one or more occasion-identification parameters identify SPS occasions to be used for reception, wherein the performing the SPS reception comprises: receiving, from the BS, a data signal in a first SPS occasion corresponding to a first bit of the first bitmap, wherein the first bit is set to 1.

Aspect 39: The method of Aspects 26 through 38, wherein the occasion-identification mode indicates the one or more occasion-identification parameters identify SPS occasions to be cancelled, and wherein the performing the SPS reception comprises: refraining from monitoring for a data signal in a first SPS occasion corresponding to a first bit of the first bitmap, wherein the first bit is set to 1.

Aspect 40: The method of Aspects 26 through 39, further comprising: receiving, from the BS, an indication of an offset associated with the occasion marker, wherein the first SPS occasion is offset relative to the occasion marker based on the offset associated with the occasion marker.

Aspect 41: The method of Aspects 26 through 40, further comprising: receiving, from the BS, a first SPS reactivation signal including a first set of one or more configuration parameters; receiving, from the BS, a second SPS reactivation signal including a second set of one or more configuration parameters with each configuration parameter of the second set having values equal to a corresponding configuration parameter in the first set, wherein the occasion marker comprises the second SPS reactivation signal.

Aspect 42: The method of Aspects 26 through 41, wherein the occasion marker is received as part of an SPS reactivation downlink control information (DCI) message.

Aspect 43: The method of Aspects 26 through 42, wherein the occasion-identification mode indicates the one or more occasion-identification parameters identify SPS occasions to be used for reception, and wherein the performing the SPS reception comprises: receiving, from the BS, a data signal in the first SPS occasion.

Aspect 44: The method of Aspects 26 through 43, wherein the occasion-identification mode indicates the one or more occasion-identification parameters identify SPS occasions to be cancelled, and wherein the performing the SPS reception comprises: refraining from monitoring for a data signal in first SPS occasion.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a base station (BS), the method comprising:
   transmitting, to a user equipment (UE), a semi-persistent scheduling (SPS) configuration indicating a plurality of SPS occasions;
   transmitting, to the UE, a mode indication indicating an occasion-identification mode, the occasion-identification mode indicating whether one or more occasion-identification parameters identify one or more SPS occasions of the plurality of SPS occasions to be cancelled or to be used for transmission;
   transmitting, to the UE, the one or more occasion-identification parameters; and
   performing SPS transmission based on the mode indication and the one or more occasion-identification parameters.

2. The method of claim 1, further comprising:
   determining the occasion-identification mode based on a traffic pattern.

3. The method of claim 2, wherein the determining the occasion-identification mode comprises:
   determining a number of SPS occasions to be cancelled is greater than a number of SPS occasions to be used for transmission; and
   determining, based on the determining the number of SPS occasions to be cancelled is greater than the number of SPS occasions to be used for transmission, that the occasion-identification mode indicates the one or more occasion-identification parameters identify SPS occasions to be used for transmission.

4. The method of claim 2, wherein the determining the occasion-identification mode comprises:
   determining a number of SPS occasions to be cancelled is less than a number of SPS occasions to be used for transmission; and
   determining, based on the determining the number of SPS occasions to be cancelled is less than the number of SPS occasions to be used for transmission, that the occasion-identification mode indicates the one or more occasion-identification parameters identify SPS occasions to be cancelled.

5. The method of claim 1, wherein the plurality of SPS occasions are associated with physical downlink shared channel (PDSCH) transmissions.

6. The method of claim 1, wherein the transmitting the mode indication comprises:
   transmitting, to the UE, a downlink control information (DCI) message comprising the mode indication.

7. The method of claim 1, wherein the transmitting the mode indication comprises:
   transmitting, to the UE, a radio resource control (RRC) message comprising the mode indication.

8. The method of claim 1, wherein the transmitting the mode indication comprises:

transmitting, to the UE, a medium access control control element (MAC-CE) comprising the mode indication.

9. A method of wireless communication performed by user equipment (UE), the method comprising:
receiving, from a base station (BS), a semi-persistent scheduling (SPS) configuration indicating a plurality of SPS occasions;
receiving, from the BS, a mode indication indicating an occasion-identification mode, the occasion-identification mode indicating whether one or more occasion-identification parameters identify SPS occasions to be cancelled or SPS occasions to be used for reception of the plurality of SPS occasions;
receiving, from the BS, the one or more occasion-identification parameters; and
performing SPS reception based on the mode indication and the one or more occasion-identification parameters.

10. The method of claim 9, wherein the plurality of SPS occasions are associated with physical downlink shared channel (PDSCH) transmissions.

11. The method of claim 9, wherein the receiving the mode indication comprises:
receiving, from the BS, a downlink control information (DCI) message comprising the mode indication.

12. The method of claim 9, wherein the receiving the mode indication comprises:
receiving, from the BS, a radio resource control (RRC) message comprising the mode indication.

13. The method of claim 9, wherein the receiving the mode indication comprises:
receiving, from the BS, a medium access control control element (MAC-CE) comprising the mode indication.

14. The method of claim 9, wherein the receiving the one or more occasion-identification parameters comprises:
receiving, from the BS, a downlink control information (DCI) message comprising at least one of the one or more occasion-identification parameters.

15. The method of claim 9, wherein the receiving the one or more occasion-identification parameters comprises:
receiving, from the BS, a configuration including a set of one or more bitmaps, wherein a length of each bitmap in the set of one or more bitmaps is associated with a time period, and each bit of a bitmap in the set of one or more bitmaps indicates whether an SPS occasion corresponding to the bit is to be cancelled or to be used for reception based on the occasion-identification mode.

16. A base station (BS) comprising:
a memory; and
one or more processors, coupled to the memory, configured to:
transmit, to a user equipment (UE), a semi-persistent scheduling (SPS) configuration indicating a plurality of SPS occasions;
transmit, to the UE, a mode indication indicating an occasion-identification mode, the occasion-identification mode indicating whether one or more occasion-identification parameters identify one or more SPS occasions of the plurality of SPS occasions to be cancelled or to be used for transmission;
transmit, to the UE, the one or more occasion-identification parameters; and
perform SPS transmission based on the mode indication and the one or more occasion-identification parameters.

17. The BS of claim 16, wherein the BS is further configured to:
determine the occasion-identification mode based on a traffic pattern.

18. The BS of claim 16, wherein the plurality of SPS occasions are associated with physical downlink shared channel (PDSCH) transmissions.

19. The BS of claim 16, wherein the BS is further configured to:
transmit, to the UE, a downlink control information (DCI) message comprising the mode indication.

20. The BS of claim 16, wherein the BS is further configured to:
transmit, to the UE, a radio resource control (RRC) message comprising the mode indication.

21. The BS of claim 16, wherein the BS is further configured to:
transmit, to the UE, a medium access control control element (MAC-CE) comprising the mode indication.

22. The BS of claim 16, wherein the BS is further configured to:
transmit, to the UE, a downlink control information (DCI) message comprising at least one of the one or more occasion-identification parameters.

23. The BS of claim 16, wherein the BS is further configured to:
transmit, to the UE, a configuration including a set of one or more bitmaps, wherein each bit of a bitmap in the set of one or more bitmaps indicates whether an SPS occasion corresponding to the bit is to be cancelled or to be used for transmission based on the occasion-identification mode.

24. A user equipment (UE) comprising:
a memory; and
one or more processors, coupled to the memory, configured to:
receive, from a base station (BS), a semi-persistent scheduling (SPS) configuration indicating a plurality of SPS occasions;
receive, from the BS, a mode indication indicating an occasion-identification mode, the occasion-identification mode indicating whether one or more occasion-identification parameters identify SPS occasions to be cancelled or SPS occasions to be used for reception of the plurality of SPS occasions;
receive, from the BS, the one or more occasion-identification parameters; and
perform SPS reception based on the mode indication and the one or more occasion-identification parameters.

25. The UE of claim 24, wherein the plurality of SPS occasions are associated with physical downlink shared channel (PDSCH) transmissions.

26. The UE of claim 24, wherein the UE is further configured to:
receive, from the BS, a downlink control information (DCI) message comprising the mode indication.

27. The UE of claim 24, wherein the UE is further configured to:
receive, from the BS, a radio resource control (RRC) message comprising the mode indication.

28. The UE of claim 24, wherein the UE is configured to:
receive, from the BS, a medium access control control element (MAC-CE) comprising the mode indication.

29. The UE of claim 24, wherein the UE is further configured to:
receive, from the BS, a downlink control information (DCI) message comprising at least one of the one or more occasion-identification parameters.

30. The UE of claim 24, wherein the UE is further configured to:
  receive, from the BS, a configuration including a set of one or more bitmaps, wherein a length of each bitmap in the set of one or more bitmaps is associated with a time period, and each bit of a bitmap in the set of one or more bitmaps indicates whether an SPS occasion corresponding to the bit is to be cancelled or to be used for reception based on the occasion-identification mode.

* * * * *